(12) United States Patent
Hwang

(10) Patent No.: US 10,055,015 B2
(45) Date of Patent: Aug. 21, 2018

(54) ELECTRONIC DEVICE AND METHOD FOR CONTROLLING EXTERNAL OBJECT

(71) Applicant: Samsung Electronics Co., Ltd., Gyeonggi-do (KR)

(72) Inventor: Seong-Hee Hwang, Gyeongsangbuk-do (KR)

(73) Assignee: Samsung Electronics Co., Ltd (KR)

(*) Notice: Subject to any disclaimer, the term of this patent is extended or adjusted under 35 U.S.C. 154(b) by 27 days.

(21) Appl. No.: 14/928,338

(22) Filed: Oct. 30, 2015

(65) Prior Publication Data
US 2016/0124506 A1    May 5, 2016

(30) Foreign Application Priority Data
Nov. 3, 2014    (KR) .................. 10-2014-0151354

(51) Int. Cl.
G09G 5/00    (2006.01)
G06F 3/01    (2006.01)
G06T 1/20    (2006.01)

(52) U.S. Cl.
CPC .............. G06F 3/013 (2013.01); G06F 3/017 (2013.01); G06T 1/20 (2013.01)

(58) Field of Classification Search
CPC ............ G06F 3/013; G06F 3/017; G06T 1/20
See application file for complete search history.

(56) References Cited

U.S. PATENT DOCUMENTS

| 5,684,531 | A * | 11/1997 | Li ........................ G01C 3/085 348/119 |
| 8,755,123 | B2 * | 6/2014 | Heimer .................... G01J 3/02 359/630 |
| 8,842,167 | B2 * | 9/2014 | Kang .................. H04N 13/0018 348/42 |
| 9,392,261 | B2 * | 7/2016 | Ogasahara ......... H04N 13/0239 |
| 2007/0024579 | A1 | 2/2007 | Rosenberg |
| 2011/0029918 | A1 | 2/2011 | Yoo et al. |
| 2011/0106339 | A1 * | 5/2011 | Phillips ................ G05D 1/0033 701/2 |

(Continued)

FOREIGN PATENT DOCUMENTS

| EP | 0 055 338 | 7/1982 |
| KR | 1020110012128 | 2/2011 |

OTHER PUBLICATIONS

Jayson Turner et al., "Combining Gaze with Manual Interaction to Extend Physical Reach", 1st International Workshop on Pervasive Eye Tracking & Mobile Eye-Based Interaction, PETMEI ' 11, XP055057128, Sep. 18, 2011, 4 pages.

(Continued)

Primary Examiner — Rodney Amadiz
(74) Attorney, Agent, or Firm — The Farrell Law Firm, P.C.

(57) ABSTRACT

Methods and apparatuses are provided for controlling an external object by an electronic device. A line of sight of a user is determined using an image sensor of the electronic device. An object located outside of the electronic device is determined based on the line of sight of the user. Object information regarding the object is determined. A user input with respect to the object is received from the user. The object or another electronic device associated with the object is controlled based on the user input and the object information.

16 Claims, 11 Drawing Sheets

(56) References Cited

U.S. PATENT DOCUMENTS

| | | |
|---|---|---|
| 2012/0272179 A1 | 10/2012 | Stafford |
| 2012/0326968 A1* | 12/2012 | Kakuda .................. G08C 19/28 |
| | | 345/156 |
| 2013/0083025 A1 | 4/2013 | Gibson et al. |
| 2013/0147686 A1 | 6/2013 | Clavin et al. |
| 2013/0307771 A1 | 11/2013 | Parker et al. |
| 2014/0062854 A1* | 3/2014 | Cho ........................ G06F 3/017 |
| | | 345/156 |
| 2014/0062874 A1* | 3/2014 | Suggs .................. G06F 3/0325 |
| | | 345/158 |

OTHER PUBLICATIONS

European Search Report dated Mar. 30, 2016 issued in counterpart application No. 15192505.4-1972, 9 pages.

* cited by examiner

ELECTRONIC DEVICE AND METHOD FOR CONTROLLING EXTERNAL OBJECT

PRIORITY

This application claims priority under 35 U.S.C. § 119(a) to Korean Patent Application Serial number 10-2014-0151354, which was filed on Nov. 3, 2014 in the Korean Intellectual Property Office, the content of which is incorporated herein by reference.

BACKGROUND

1. Field of the Invention

The present invention relates generally to an electronic device, and more particularly, to an electronic device and a method for controlling an external object.

2. Description of the Related Art

Short-range communication methods have been developed and diversified for controlling digital devices or sharing information of the digital devices. One such short-range communication method has been developed to control a first device (a slave device) of plurality of devices capable of wirelessly communicating with one another using a second device (a master device) of the plurality of devices.

In order to control the slave device using the master device, a user is required to register the slave device in the master device. Even if slave devices have already been registered in the master device, the user must search the slave devices registered in the master device to select a desired slave device from among the registered slave devices.

SUMMARY

The present invention has been made to address at least the above problems and/or disadvantages and to provide at least the advantages described below. Accordingly, an aspect of the present invention provides an electronic device and a method for controlling an external object using a user's line of sight (or direction of gaze, or viewing direction), thereby eliminating the need for a user to manually select a slave device.

According to an aspect of the present invention, a method is provided for controlling an external object by an electronic device. The method includes determining, by the electronic device, a line of sight of a user using an image sensor of the electronic device; determining, by the electronic device, an object located outside of the electronic device based on the line of sight of the user; determining, by the electronic device, object information regarding the object; receiving, at the electronic device, a user input with respect to the object from the user; and controlling, by the electronic device, the object or another electronic device associated with the object based on the user input and the object information.

According to another aspect of the present invention, an electronic device is provided for controlling an external object. The electronic device includes a controller configured to determine a line of sight of a user using an image sensor of the electronic device, determine an object located outside of the electronic device based on the line of sight of the user, determine object information regarding the object, and generate a control signal for controlling the object or another electronic device associated with the object based on a user input with respect to the object and the object information, upon receiving the user input from the user; and a communication interface configured to transmit the control signal to the object or the other electronic device associated with the object.

According to another aspect of the present invention, a computer-readable recording medium is provided having recorded thereon a program for executing operations of: determining a line of sight of a user using an image sensor; determining an object located outside of an electronic device comprising the computer-readable recording medium, based on the line of sight of the user; determining object information regarding the object; receiving a user input with respect to the object from the user; and controlling the object or another electronic device associated with the object based on the user input and the object information.

According to another aspect of the present invention, a method is provided for controlling an external object by an electronic device. The method includes capturing, by the electronic device, an image of an eye of a user of the electronic device; determining, by the electronic device, a line of sight of the user based on the image of the eye of the user; capturing, by the electronic device, a view image in a direction that the user views; selecting, by the electronic device, an object from the view image based on the line of sight of the user; receiving, at the electronic device, a user input with respect to the object from the user; and controlling, by the electronic device, the object or another electronic device associated with the object based on the user input.

According to another aspect of the present invention, an electronic device is provided for controlling an external object. The electronic device includes a camera module configured to capture an image of an eye of a user of the electronic device, and capture a view image in a direction that the user views; a controller configured to: determine a line of sight of the user based on the image of the eye of the user, select an object from the view image based on the line of sight of the user, and generate a control signal for controlling the object or another electronic device associated with the object based on a user input with respect to the object, upon receiving the user input from the user; and a communication interface configured to transmit the control signal to the object or the other electronic device associated with the object.

According to another aspect of the present invention, a method is provided for controlling an external object by an electronic device. The method includes capturing, by the electronic device, an image of an eye of a user of the electronic device; determining, by the electronic device, a viewing point based on the image of the eye of the user; determining, by the electronic device, an object corresponding to a coordinate of the viewing point; receiving, at the electronic device, a user input with respect to the object from the user; and controlling, by the electronic device, the object or another electronic device associated with the object based on the user input.

According to another aspect of the present invention, an electronic device is provided for controlling an external object. The electronic device includes a camera module configured to capture an image of an eye of a user of the electronic device; a controller configured to: determine a viewing point based on the image of the eye of the user, generate a control signal for controlling the object or another electronic device associated with the object based on a user input with respect to the object, upon receiving the user input from the user; and a communication interface configured to transmit the control signal to the object or the other electronic device associated with the object.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
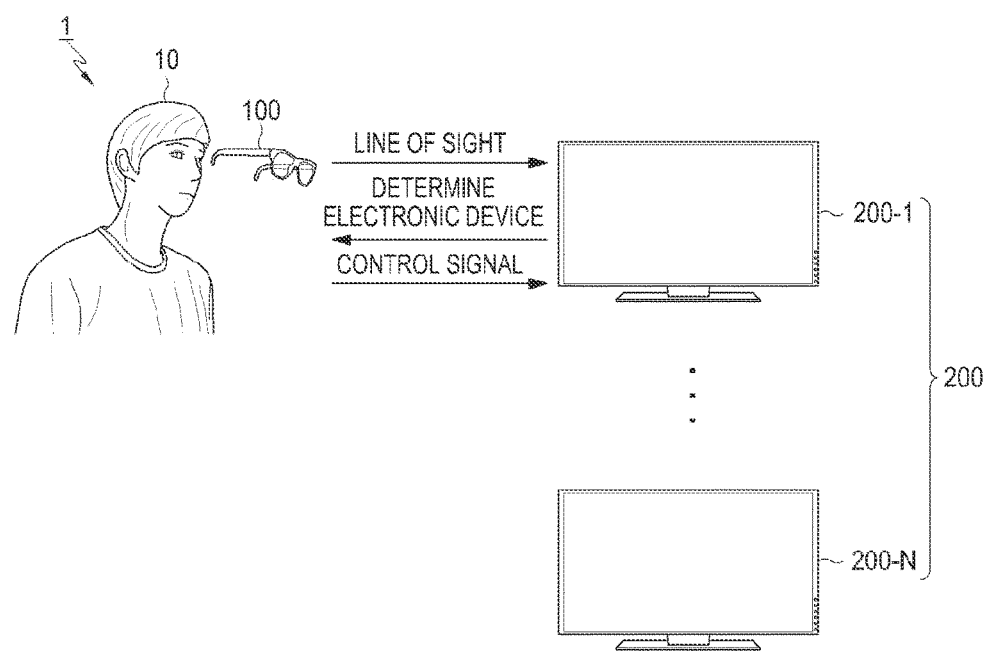
FIG. 1 is a diagram illustrating a control system including an electronic device capable of controlling an external object, according to an embodiment of the present invention.

Embodiments of the present invention are described in detail with reference to the accompanying drawings. The same or similar components may be designated by the same or similar reference numerals although they are illustrated in different drawings. Detailed descriptions of constructions processes known in the art may be omitted to avoid obscuring the subject matter of the present invention.

As used herein, the terms "include" and "comprise," as well as derivatives thereof, mean inclusion without limitation. Additionally, the term "or," is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. Such a device may be implemented in hardware, firmware, software, or some combination of at least two of the same. It should be noted that the functionality associated with any particular controller may be centralized or distributed, whether locally or remotely. Definitions for certain words and phrases are provided throughout this patent document, and those of ordinary skill in the art should understand that in many, if not most instances, such definitions apply to prior, as well as future, uses of such defined words and phrases.

Terms "have", "may have", "include", or "may include" used in various embodiments of the present invention indicate the existence of a disclosed function, operation, or component, but do not exclude one or more additional functions, operations, or components.

Herein, expressions such as "A or B", "at least one of A or B", and "one or more of A and/or B" may include all possible combinations of items listed together. For example, "A or B", "at least one of A or B", and "one or more of A and/or B" may refer to (1) including at least A, (2) including at least B, and (3) including at least A and at least B.

Although ordinal numbers such as "first", "second", and so forth will be used to describe various components, those components are not limited by these terms. For example, the terms do not limit the order and/or importance of the components. The terms are used for distinguishing one component from another component. For example, a first user device and a second user device are both user devices, and indicate different user devices. Also, a first component may be referred to as a second component and likewise, a second component may also be referred to as a first component, without departing from the teaching of the present invention.

When it is said that a component (for example, a first component) is "connected" or "coupled" with another component (for example, a second component), the component may be directly connected with another component, or still another component (for example, a third component) may exist between the components. On the other hand, when it is said that a component is "directly connected" or "directly coupled" with another component, no component exists between the components.

As used herein, without limitation, the phrase "configured to" may be interchangeably used with other terms, such as "suitable for," "having the capacity to," "designed to," "adapted to," "made to," or "capable of," depending on the circumstances. In certain examples, the term "configured to" may not necessarily mean "specifically designed to" in a hardware sense. Rather, in a certain context, the term "configured to" may mean "capable of" with assistance of other devices or components. For example, the phrase "a processor configured to perform A, B, and C" may mean a dedicated processor (for example, an embedded processor) for performing corresponding operations or a generic-purpose processor (for example, a Central Processing Unit (CPU) or an application processor) that may perform corresponding operations by executing one or more software programs stored in a memory device.

Terms used herein are intended to describe an embodiment of the present invention, rather than limit the embodiments of the present invention. As used herein, singular forms are intended to include plural forms as well, unless the context clearly indicates otherwise. Unless otherwise defined, all terms (including technical and scientific terms) used herein have the same meanings as those commonly understood by one of ordinary skill in the art to which the embodiments of the present invention belong. It will be further understood that terms, such as those defined in commonly used dictionaries, should be interpreted as having a meaning that is consistent with their meaning in the specification within the context of the relevant art as understood by the artisan at the time of disclosure, and will not be interpreted in an idealized or overly formal sense unless expressly so defined herein.

An electronic device, according to an embodiment of the present invention, may be a device having a short-range communication function. For example, the electronic device may be embodied as a combination of one or more of a smart phone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MP3 player, mobile medical equipment, an electronic bracelet, an electronic necklace, an electronic appcessory, a camera, a wearable device (for example, a Head-Mounted Device (HMD) such as electronic glasses), an electronic cloth, an electronic bracelet, an electronic necklace, an electronic appcessory, an electronic tattoo, and a smart watch.

According to an embodiment of the present invention, the electronic device may be a smart home appliance having a short-range communication function. The smart home appliance may include, for example, a Television (TV), a Digital Video Disk (DVD) player, audio equipment, a refrigerator, an air conditioner, a vacuum cleaner, an oven, a microwave oven, a laundry machine, an air cleaner, a set-top box, a TV box, a game console, an electronic dictionary, an electronic key, a camcorder, and an electronic frame.

According to an embodiment of the present invention, the electronic device may include at least one piece of various medical equipment (for example, Magnetic Resonance Angiography (MRA), Magnetic Resonance Imaging (MRI), Computed Tomography (CT), an imaging device, or an ultrasonic device), a navigation system, a Global Positioning System (GPS) receiver, an Event Data Recorder (EDR), a Flight Data Recorder (FDR), a vehicle infotainment device, electronic equipment for ships (for example, navigation system and gyro compass for ships), avionics, a security device, a vehicle head unit, an industrial or home robot, an Automatic Teller's Machine (ATM), a Point of Sales (POS), and Internet of things (for example, light bulbs, various sensors, electric or gas meters, sprinkler devices, fire alarms, thermostats, streetlamps, toasters, sporting goods, hot water tanks, heaters, boilers, and the like).

According to an embodiment of the present invention, the electronic device may include a part of a furniture or building/structure having a communication function, an electronic board, an electronic signature receiving device, a projector, and various measuring instruments (for example, a water, electricity, gas, or electric wave measuring device). The electronic device, according to an embodiment of the present invention, may be one of the above-listed devices or a combination thereof. The electronic device, according to an embodiment of the present invention, may be a flexible device. It will be obvious to those of ordinary skill in the art that the electronic device is not limited to the above-listed devices, and new electronic devices based on technology development may be included.

Hereinafter, an electronic device, according to an embodiment of the present invention, will be described with reference to the accompanying drawings. Herein, the term "user" used in various embodiments of the present invention may refer to a person who uses the electronic device or a device using the electronic device (for example, an artificial intelligence electronic device).

FIG. 1 is a diagram illustrating a control system including an electronic device capable of controlling an external another object, according to an embodiment of the present invention.

Referring to FIG. 1, a control system 1 includes a first electronic device 100 and at least one target object that may be controlled by the first electronic device 100, for example, second electronic devices 200-1, . . . , 200-N (collectively referred to as a second electronic device 200). FIG. 1 shows an embodiment where the first electronic device 100 is implemented in the form of glasses. According to other embodiments of the present invention, the first electronic device 100 may be an electronic device, which is capable of communicating with another electronic device, such as, for example, a mobile terminal, a Personal Computer (PC), a Television (TV), a laundry machine, or the like. The second electronic device 200 may also be an electronic device capable of communicating with another electronic device, such as a mobile terminal, a PC, a TV, a laundry machine, or the like.

The first electronic device 100 controls a target object, selected by a user 10 using the first electronic device 100, from among objects located outside the first electronic device 100 (for example, from among the second electronic devices 200). The target object represents an object the user desires to select. The user may select a target object by viewing one or more objects while wearing the first electronic device 100 implemented in the form of glasses.

As illustrated in FIG. 1, the first electronic device 100 implemented in the form of glasses senses a line of sight of the user 10 wearing the first electronic device 100 and analyzes a sensing result to determine a target object. Referring to FIG. 1, the first electronic device 100 determines that the second electronic device 200-1 is the target object by analyzing the line of sight of the user 10.

If the target object, for example, the second electronic device 200-1, is determined by the user 10, the first electronic device 100 establishes a connection between the first electronic device 100 and the second electronic device 200-1, such that the first electronic device 100 is paired with the second electronic device 200-1. According to an embodiment of the present invention, the first electronic device 100 establishes a connection between the first electronic device 100 and the second electronic device 200-1, such that the first electronic device 100 operates as a master device and the second electronic device 200 operates as a slave device. The first electronic device 100 generates a device control signal for controlling the second electronic device 200-1. The first electronic device 100 generates the device control signal based on control information corresponding to the second electronic device 200-1. According to an embodiment of the present invention, the first electronic device 100 generates a device control signal for controlling the second electronic device 200-1 based on a user input from the user 10. Once the device control signal is generated, the first electronic device 100 transmits the device control signal to the second electronic device 200-1, for example, by using wireless communication. The second electronic device 200-1 performs an operation corresponding to the device control signal received from the first electronic device 100, thus operating under control of the first electronic device 100.

Figure 2:
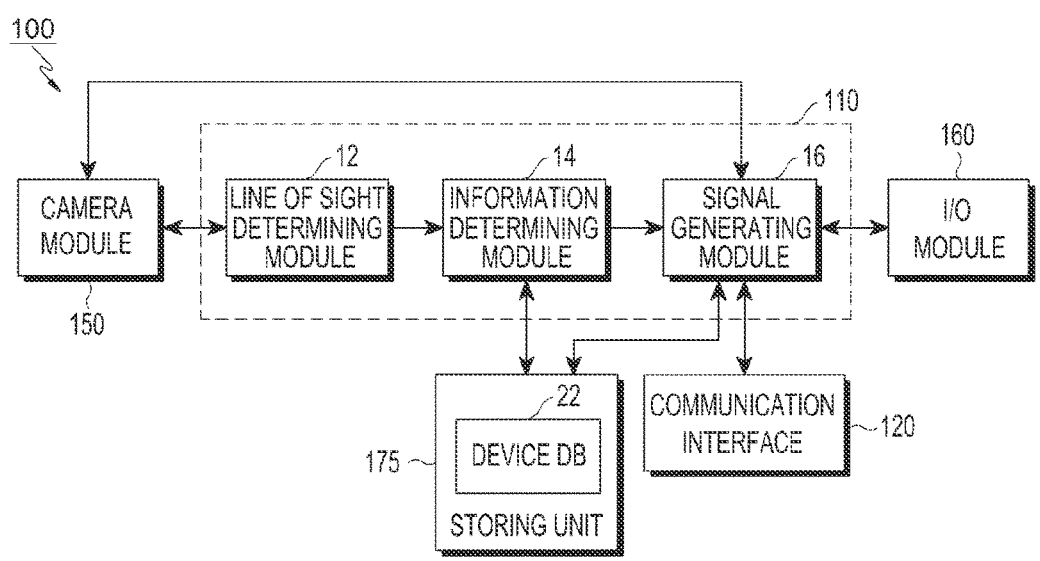
FIG. 2 is a block diagram illustrating a first electronic device for controlling an external object, according to an embodiment of the present invention.

FIG. 2 is a block diagram illustrating a first electronic device controlling an external object, according to an embodiment of the present invention.

Referring to FIG. 2, the first electronic device 100 includes at least one of a controller 110, a communication interface 120, a camera module 150, a storing unit 175, and an I/O module 160.

The controller 110 controls the overall operation of the first electronic device 100. The controller 110 determines the target object, which the user 10 currently views, by analyzing a line of sight of the user 10. The controller 110 determines another electronic device associated with the target object, which the user 10 currently views. For example, the controller 110 may determine that the second electronic device 200 is the target object selected by the user 10 or an electronic device associated with the target object.

When the second electronic device 200 is determined as the target object, the controller 110 searches a device DB 22 in the storing unit 175 for various information (hereinafter, referred to as "object information") corresponding to the second electronic device 200. The object information may include at least one of a brand name associated with the object, a form of the object, an arrangement form of a particular button included in the object, a color of the object, an accessory attached to the object, a trademark of the object, and text information associated with the object. The controller 110 controls the target object or an operation of the electronic device associated with the target object, based on the object information.

The controller 110 controls the first electronic device 100 based on the object information corresponding to the second electronic device 200, such that the first electronic device 100 and the second electronic device 200 are connected with each other. The controller 110 controls the first electronic device 100 to pair the first electronic device 100 with the second electronic device 200, such that the first electronic device 100 may control the second electronic device 200 at a later time. Once the first electronic device 100 and the second electronic device 200 are paired with each other, the controller 110 receives a user input through the camera module 150 or the I/O module 160. The user input may be a user input for controlling the target object or an electronic device associated with the target object, for example, the second electronic device 200. Upon receiving the user input for controlling the second electronic device 200, the controller 110 generates a device control signal corresponding to the user input. Once the device control signal is generated, the controller 110 transmits the device control signal to the second electronic device 200 through the communication interface 120.

According to an embodiment of the present invention, the second electronic device 200 receives a device control signal from the first electronic device 100 and perform an operation corresponding to the device control signal. As the second electronic device 200 performs the operation corresponding to the device control signal, the first electronic device 100 may control the second electronic device 200.

To perform such an operation, the controller 110 includes at least one of a line of sight determining module 12, an information determining module 14, and a signal generating module 16. For convenience, a description is provided regarding a case in which the target object selected by the user is an electronic device other than the first electronic device 100, for example, the second electronic device 200.

The line of sight determining module 12 analyzes an image generated by the camera module 150, for example, an eye image. According to an embodiment of the present invention, if the user input for controlling the target object located outside the first electronic device 100 is input through the I/O module 160, the line of sight determining module 12 controls the camera module 150 to generate an eye image or a view image.

Once the eye image is generated, the line of sight determining module 12 determines a viewing point in the user's line of sight or a direction of the user's line of sight, by analyzing the eye image. According to an embodiment of the present invention, the line of sight determining module 12 analyzes the eye image by using various pieces of data stored in advance in the storing unit 175, such as, for example, an iris of the user 10, a thickness of a crystalline lens, a size of a pupil, the degree to which an eyelid is closed, an angle or a distance between the eye and the camera module 150, or a facial image of the user 10. The line of sight determining module 12 may obtain data, such as, for example, the shape of the iris of the user 10, the thickness of the crystalline lens, the size of the pupil, the degree to which the eyelid is closed, the angle or distance between the eye and the camera module 150, or the facial image of the user 10, as an analysis result with respect to the eye image. The line of sight determining module 12 determines the viewing point or the direction of the line of sight of the user 10 based on the analysis result with respect to the eye image.

The line of sight determining module 12 determines whether the target object is located close to or far away from the first electronic device 100 or the user 10, by using the thickness of the crystalline lens. For example, if the crystalline lens is thin, the line of sight determining module 12 may determine that the target object is located far away from the user 10, and if the crystalline lens is thick, the line of sight determining module 12 may determine that the target object is located close to the user 10.

According to an embodiment of the present invention, the line of sight determining module 12 controls the camera module 150 to continuously photograph an eye of the user 10 for a preset time period (for example, 1 second). By controlling the camera module 150 to continuously photograph the eye of the user 10 for a preset time period and generate a plurality of eye images, the line of sight determining module 12 may measure a change in the thickness of the crystalline lens. Based on the change in the thickness of the crystalline lens, the line of sight determining module 12 may determine whether the target object is located close to or far away from the user 10. The line of sight determining module 12 may determine a distance to the target object from the user 10 (for example, 10 m) based on the change in the thickness of the crystalline lens.

The line of sight determining module 12 may obtain environment data regarding an ambient environment of the first electronic device 100 based on the size of the pupil. Generally, the size of the pupil is adjusted according to whether the environment is dark or bright. The line of sight determining module 12 determines the ambient environment of the first electronic device 100 (for example, in a radius of 5 m from the first electronic device 100), by checking the size of the pupil included in the eye image. For example, the controller 110 may determine a brightness level of the ambient environment based on a diameter of the pupil of the user 10. If the diameter of the pupil of the user 10 is 1 cm, the brightness level may be 1, and if the diameter of the pupil of the user 10 is 5 mm, the brightness level may be 5. The brightness level of the ambient environment with respect to the diameter of the pupil may be a value stored in advance in the storing unit 175.

Once the ambient environment of the first electronic device 100 is determined to be dark by the line of sight determining module 12, the line of sight determining module 12 determines whether an illuminating device exists near the first electronic device 100, by referring to previously stored Global Positioning System (GPS) information, map coordinates, or an Access Point (AP) position.

The GPS information indicates the target object or GPS coordinates of the second electronic device 200. The map coordinates indicate a position of the target object or the second electronic device 200 on a map stored in the first electronic device 100. For example, it is assumed that the user 10 controls objects in the house by using the first electronic device 100. The first electronic device 100 generates and stores a map indicating positions of the objects in the house. The first electronic device 100 determines coordinates of the target object or the second electronic device 200 included in a map stored in advance in the storing unit 175, that is, map coordinates. The first electronic device 100 stores the map coordinates corresponding to the target object or the second electronic device 200 in the storing unit 175. The first electronic device 100 recognizes the target object or the second electronic device 200 included in the view image by using the map coordinates. The AP position indicates an AP position of the second electronic device 200.

The line of sight determining unit 12 determines whether the illuminating device is the target object based on the GPS information, the map coordinates, or the AP position. As such, the line of sight determining module 12 determines the line of sight of the user 10 or the target object corresponding to the line of sight, by using various data obtained from the eye image.

Once the line of sight of the user 10 or the target object is determined, the line of sight determining module 12 controls the camera module 150 to generate the view image. The camera module 150 photographs at least one object along the line of sight of the user 10 to generate the view image. Once the view image is generated, the line of sight determining module 12 determines the target object from among objects included in the view image. For example, the line of sight determining module 12 may extract a contour of an object that best matches the direction of the line of sight of the user 10 among the objects included in the view image, and may determine the object having the contour as the target object.

The line of sight determining module 12 extracts a contour of each object included in the view image. For example, assuming that a TV and a monitor are included in the view image, the line of sight determining module 12 may extract the contours of the TV and the monitor. The line of sight determining module 12 identifies the objects included in the view image by distinguishing the contours extracted from the view image, and determines at least one of the objects as the target object. For example, assuming that objects included in the view image are a TV and a Digital Versatile Disc (DVD) player, the line of sight determining module 12 may determine that the TV is the target object based on an analysis result with respect to the eye image.

Once the target object is determined from among the objects included in the view image, the information determining module 14 extracts recognition data corresponding to the target object, for example, the second electronic device 200. For example, the recognition data may include a device code of the target object, a contour or at least one feature image of the target object, text data associated with the target object, an external device associated with the target object, an appcessory associated with the target object, a Medium Access Control (MAC) address of the target object, an AP address, a Location Based Service (LBS) address, an ID, and the like. The device code may include an ID, a MAC address, an AP address, a bar code, a Quick Response (QR) code, and the like. The information determining module 14 may recognize, from the device code, object information including, for example, a device name of the target object, a brand name of the target object, or the like, as detailed information regarding the target object.

According to an embodiment of the present invention, the information determining module 14 detects, from the view image, the feature image in an area located inside or near the contour. For example, assuming that the target object is the TV, the information determining module 14 detects an on/off button of the TV, located inside the contour of the TV, as a feature image. The information determining module 14 may obtain the object information regarding the target object from the feature image, for example, the form of the on/off button. The information determining module 14 may obtain, from the feature image, at least one of a brand name associated with an object located in an area inside the contour, the form of the object, the arrangement form of a particular button included in the object, the color of the object, an accessory attached to the object, a trademark of the object, and text information associated with the object, that is, the object information.

According to an embodiment of the present invention, the feature image further includes text located inside the contour. For example, it is assumed that the brand name of the target object is "LKH" and the brand name LKH is marked in the center of a lower portion of the target object. The information determining module 14 may extract the whole "LKH" as a single feature image, or may extract the text LKH as text data. As such, the information determining module 14 analyzes the view image to obtain the object information. The information determining module 14 may determine an area inside or near the contour of the target object in the view image as one image region, and obtain object information regarding the target object by using the feature image or text data included in the image region.

The external device associated with the target object is a device that may be connected with the target object in a wireless or wired manner. Assuming that the target object is the PC, a mouse, a keyboard, or the like may be an external device associated with the target object.

The appcessory associated with the target object may be another external device that may be controlled by the target object in connection with an application stored in advance in the target object. The appcessory may be a bulb, on/off, light brightness, or color of which may be controlled by a smart phone, a temperature control device for controlling the indoor temperature with the smart phone, or the like. As the target object or the appcessory associated with the target object, there may be image devices such as a mirroring device, a chrome cast, all share cast dongle, and the like.

According to an embodiment of the present invention, the information determining module 14 recognizes an object connected with the target object from the view image, thereby recognizing an external device associated with the target object or the appcessory associated with the target object. By recognizing an object or an appcessory associated with the target object, the information determining module 14 may derive object information regarding the target object.

Once the object information regarding the target object is determined, the information determining module 14 determines whether the first electronic device 100 controls the target object. According to an embodiment of the present invention, the information determining module 14 determines whether the first electronic device 100 controls the target object, for example, the second electronic device 200, based on a device list stored in advance in the storing unit 175. The device list may be a list of objects that may be controlled by the first electronic device 100.

According to an embodiment of the present invention, the information determining module 14 determines whether the target object, for example, the second electronic device has been controlled before by the first electronic device 100, based on the device list or a control history. The control history may include histories in which respective objects are controlled by the first electronic device 100. The device list or the control history may be stored in a device DB 22.

If the target object has already been registered in the device list, the information determining module 14 determines the target object as a target object that may be controlled by the first electronic device 100. If the target object has not been registered in the device list, the information determining module 14 controls the communication interface 120 to request control information for controlling the second electronic device 200 from the outside.

The control information may include data necessary for generating a device control signal for controlling the second electronic device 200, for example, a conversion function. According to an embodiment of the present invention, the control information is stored in advance in the storing unit 175. The storing unit 175 may have stored control history or control information corresponding to the target object, and according to another embodiment of the present invention, one of the control history or the control information has been stored corresponding to the target object in the storing unit 175. If the target object has been registered in the device list, the information determining module 14 determines whether the control information for controlling the target object has been stored in the storing unit 175. If the control information has not been stored in the storing unit 175, the information determining module 14 controls the communication interface 120 to send a request for the control information to an external server. According to an embodiment of the present invention, the device list includes a downloading path along which control information corresponding to each target object is downloadable. The information determining module 14 controls the communication interface 120 to access a corresponding download address and to receive control information.

According to an embodiment of the present invention, the control information has been received from the external server through the communication interface 120. The information determining module 14 may request an external server (for example, a portal server, or the like) to search for control information corresponding to a target object, by delivering an image of the target object or a product name of the target object included in a view image, if a control history regarding the target object has not been stored in the storing unit 175 and the target object has not been registered in the device list. According to an embodiment of the present invention, the external server searches for control information for controlling the target object to transmit the control information to the first electronic device 100, or informs the first electronic device 100 of a downloading path along which the control information is downloadable.

The signal generating module 16 generates a device control signal for controlling the target object, for example, the second electronic device 200, based on the control information. For example, the signal generating module 16 may convert a user input inputted to the first electronic device 100 into a command in a format suitable for the second electronic device 200. Since the user input has been converted into the command suitable for the second electronic device 200, the second electronic device 200 may perform an operation corresponding to the command.

According to an embodiment of the present invention, the signal generating module 16 controls the communication interface 120 in such a way as to pair the first electronic device 100 with the target object, for example, the second electronic device 200. The signal generating module 16 generates a request message for requesting pairing with the first electronic device 100 and sends the request message to the second electronic device 200 through the communication interface 120. According to an embodiment of the present invention, the signal generating module 16 sets the first electronic device 100 as a master device and generates the device control signal for setting the target object, for example, the second electronic device 200, as a slave device. The signal generating module 16 controls the communication interface 120 to transmit the device control signal to the second electronic device 200.

The following description includes operations of the line of sight determining module 12, the information determining module 14, and the signal generating module 16 when the target object selected by the user is not an electronic device.

Once an eye image is generated by the camera module 150, the line of sight determining module 12 analyzes the eye image to calculate a viewing point which the user views or a direction of the line of sight of the user 10. The line of sight determining module 12 obtains, from the eye image, data such as the iris of the user 10, the thickness of the crystalline lens, the size of the pupil, the degree to which the eyelid is closed, the angle or distance between the eye and the camera module 150, the facial image of the user 10, and so forth, as an analysis result with respect to the eye image. The line of sight determining module 12 determines the viewing point or the direction of the line of sight of the user 10 based on the analysis result with respect to the eye image.

Once the line of sight or the target object of the user 10 is determined, the line of sight determining module 12 controls the camera module 150 to generate the view image and determine the target object, as described above.

According to an embodiment of the present invention, the line of sight determining module 12 extracts a contour of each object included in the view image. For example, assuming that a cleaning robot and a piece of tissue are included in the view image, the line of sight determining module 12 may extract contours of the cleaning robot and the piece of tissue. The line of sight determining module 12 distinguishes the contours extracted from the view image to distinguish objects included in the view image, and determines at least one of the objects as the target object. In the following description, for convenience, it is assumed that the piece of tissue is a target object. Thus, the line of sight determining module 12 analyzes the eye image or the view image and determines the piece of tissue as the target object.

If the target object is determined from among the objects included in the view image, the information determining module 14 extracts recognition data corresponding to the target object, for example, the piece of tissue. For example, the recognition data may include the contour or at least one feature image of the target object. The information determining module 14 recognizes the name, shape, type, or characteristic of the target object based on the contour or the at least one feature image of the target object. For example, the information determining module 14 recognizes, by using the contour or at least one feature image of the piece of tissue included in the view image, that the target object is the piece of tissue. If data corresponding to the recognition data extracted from the view image is not stored in the storing unit 175, the information determining module 14 transmits the contour or the at least one feature image of the target object to the external server to control the communication interface 120 to send a request for searching.

Once the target object included in the view image is determined, the information determining module 14 determines whether the target object is controllable by the first electronic device 100. For example, the information determining module 14 may determine whether the piece of tissue is controllable by the first electronic device 100.

Typically, if the target object is not an electronic device, the first electronic device 100 is not capable of directly controlling the target object. Even when the target object is an electronic device, if the target object may not communicate in a wired or wireless manner, the first electronic device 100 may not directly control the target object. As such, if the target object may not be controlled by the first electronic device 100, the information determining module 14 may determine another electronic device (hereinafter, referred to as a "related device") associated with the target object as a control target. That is, since the target object is not an electronic device, the first electronic device 100 controls the related device to perform a particular operation, thereby changing a state of the target object. For example, assuming that the target object is a piece of tissue, the first electronic device 100 may control a cleaner, which is a related device of the piece of tissue, to perform a cleaning operation, thereby removing the piece of tissue.

According to an embodiment of the present invention, the related device is an electronic device capable of communicating with the first electronic device 100 among electronic devices located adjacent to the target object. The information determining module 14 determines an electronic device associated with the target object as a related device. For example, if the target object is a piece of tissue, the information determining module 14 may determine a cleaning robot as a related device. For example, if the target object is laundry, the information determining module 14 may determine a laundry machine as a related device. According to an embodiment of the present invention, the storing unit 175 has stored a related device of the target object. For example, in the device list stored in the storing unit 175, a laundry machine or a clothes dryer may be designated.

Once the target object is determined, the information determining module 14 controls the first electronic device 100 to indicate electronic devices associated with the target object. For example, the information determining module 14 may control the first electronic device 100 to indicate a laundry machine, a clothes dryer, or the like to the user as related devices corresponding to the target object, the laundry. The user 10 may directly select a related device by inputting a user input for selecting at least one of the indicated related devices to the first electronic device 100.

Once the related device is determined, the information determining module 14 extracts recognition data corresponding to the related device, for example, the second electronic device 200. For example, the recognition data may include a device code of the related device, a contour or at least one feature image of the related device, text data associated with the related device, an external device associated with the related device, an appcessory associated with the related device, and so forth. The device code may include, for example, a bar code, a QR code, and the like.

The information determining module 14 may obtain, from the device code, object information including, for example, a device name of the related device, a product name of the related device, a brand name of the related device, and so forth, as detailed information regarding the related device.

According to an embodiment of the present invention, the information determining module 14 detects a feature image from an area located inside or adjacent to the contour of the related device in the view image. For example, assuming that the related device is a laundry machine, the information determining module 14 may detect an on/off button of the laundry machine located inside the contour of the laundry machine as a feature image. The information determining module 14 obtains object information regarding the related device from the feature image, for example, the form of the on/off button.

The feature image may further include text inside the contour. For example, it is assumed that the brand name of the target object is "ENTI" and the brand name ENTI is indicated in the center of a lower portion of the target object. The information determining module 14 extracts the whole "ENTI" as one feature image, or extracts the text ENTI as text data according to an embodiment of the present invention. As such, the information determining module 14 analyzes the view image to obtain the object information regarding the related device. The information determining module 14 determines an area located inside or adjacent to the contour of the related device in the view image as one image area, and obtains the object information regarding the related device by using the feature image or the text data included in the image area.

The external device associated with the related device is a device that may be wiredly or wirelessly connected with the related device. Assuming that the related device is a PC, a mouse, a keyboard, and so forth may be external devices associated with the related device. An appcessory associated with the related device may be another external device that is controllable by the related device in association with an application stored in advance in the related device.

The information determining module 14 recognizes an external device associated with the related device or an appcessory associated with the related device by recognizing an object connected with the related device from the view image. By recognizing the object or appcessory connected with the related device, the information determining module 14 may derive the object information regarding the related device.

Once the object information regarding the related device is determined, the information determining module 14 determines whether the first electronic device 100 is capable of controlling the related device. The information determining module 14 may determine whether the first electronic device 100 is capable of controlling the related device, for example, the second electronic device 200, based on a device list stored in advance in the storing unit 175. The device list may a list of objects that are controllable by the first electronic device 100.

The information determining module 14 determines, based on the device list or the control history, whether a related device, for example, the second device 200, has ever been controlled before by the first electronic device 100. The control history may include histories of controlling respective objects by the first electronic device 100. According to an embodiment of the present invention, the device list or the control history has been stored in the device DB 22.

If the related device has been already registered in the device list, the information determining module 14 may determine that the related device is controllable by the first electronic device 100. On the other hand, if the related device has not been registered in the device list, the information determining module 14 may control the communication interface 120 to send a request for control information for controlling the second electronic device 200 to an external device.

The control information may include data necessary for generating a device control signal for controlling the related device, for example, the second electronic device 200, for example, a conversion function. The control information may be stored in advance in the storing unit 175. For a target object for which a control history has been already stored in the storing unit 175, the control information for controlling the related device may have also been stored in the storing unit 175. If the related device has been registered in the device list, the information determining module 14 determines whether control information for controlling the related device has been stored in the storing unit 175. If the control information has not been stored in the storing unit 175, the information determining module 14 controls the communication interface 120 to send a request for the control information to an external server. According to an embodiment of the present invention, the device list includes a downloading path along which the control information corresponding to the related device is downloadable. The information determining module 14 controls the communication interface 120 to access a corresponding download address and to receive the control information.

According to an embodiment of the present invention, the control information has been received from the external server through the communication interface 120. The information determining module 14 may request an external server (for example, a portal server, or the like) to search for control information corresponding to a target object, by delivering an image of the target object or a product name of the target object included in a view image, if a control history regarding the target object has not been stored in the storing unit 175 and the target object has not been registered in the device list. According to an embodiment of the present invention, the external server searches for control information for controlling the target object to transmit the control information to the first electronic device 100, or informs the first electronic device 100 of a downloading path along which the control information is downloadable.

The signal generating module 16 generates a device control signal for controlling the related device, for example, the second electronic device 200, based on the control information. For example, the signal generating module 16 may convert a user input inputted to the first electronic device 100 into a command in a format suitable for the second electronic device 200. Since the user input has been converted into the command suitable for the second electronic device 200, the second electronic device 200 may perform an operation corresponding to the command.

The signal generating module 16 may control the communication interface 120 in such a way to pair the first electronic device 100 with the target object, for example, the second electronic device 200. The signal generating module 16 generates a request message for requesting pairing with the first electronic device 100 and sends the request message to the second electronic device 200 through the communication interface 120. According to an embodiment of the present invention, the signal generating module 16 sets the first electronic device 100 as a master device and generates the device control signal for setting the target object, for example, the second electronic device 200, as a slave device.

The signal generating module 16 controls the communication interface 120 to transmit the device control signal to the second electronic device 200.

According to an embodiment of the present invention, the first electronic device 100 simultaneously controls a plurality of target objects. The signal generating module 16 of the controller 110 may generate device control signals to be transmitted to respective target objects based on control information corresponding to the respective target objects. For example, it is assumed that the target objects are electronic devices capable of communicating with the first electronic device 100, such as, for example, a TV, a first monitor, a second monitor, and a tablet PC. The first electronic device 100 may control an operation of each of the TV, the first monitor, the second monitor, and the tablet PC, and accordingly, control data displayed on each of the TV, the first monitor, the second monitor, and the tablet PC.

According to an embodiment of the present invention, the controller 110 of the first electronic device 100 controls the first electronic device 100 such that target objects are paired with each other. For example, if a user input for sharing data between the TV and the tablet PC is input through the camera module 150 or the I/O module 160, the controller 110 controls the communication interface 120 to control connection setup between the PC and the tablet PC, such that the TV is paired with the tablet PC. Once the TV and the tablet PC are paired with each other by the first electronic device 100, the TV and the tablet PC may display the same data on respective screens under control of the first electronic device 100 or share data with each other. The controller 110 transmits data stored in the TV to the tablet PC according to the user input, and controls the TV and the tablet PC in such a way that the tablet PC displays data received from the TV. For example, it is assumed that, after the user 10 provides a user input, to the first electronic device 100, for displaying data, which is currently displayed on the TV, on another device, a user input for setting a second monitor as the other device is input to the first electronic device 100. The first electronic device 100 may simultaneously control the TV and the second monitor in such a way that data currently displayed on the TV is transmitted to and displayed on the second monitor, in real time corresponding to such user inputs. In this case, the user 10 may input to the camera module 150 of the first electronic device 100, a gesture input of stretching the right arm toward the TV and then making a first with the right hand, as the user input for displaying the data currently displayed on the TV, on the other device. The user 10 may input to the camera module 150, the gesture input of moving the right arm to face the second monitor and then opening the fisted right hand, as the user input for setting the other device.

The communication interface 120 performs wired or wireless communication of the first electronic device 100. According to an embodiment of the present invention, the communication interface 120 transmits a device control signal generated by the controller 110 to the target object or the device (the related device) associated with the target object. The communication interface 120 may request that an external server transmit control information corresponding to the target object or the related device under control of the controller 110. The communication interface 120 may receive the control information from the external server and store the received control information in the storing unit 175, under control of the controller 110.

According to an embodiment of the present invention, the communication interface 120 transmits the generated device control signal to the target object or the related device under control of the controller 110. The communication interface 120 may request that the external server transmit control information corresponding to the target object or the related device under control of the controller 110. According to an embodiment of the present invention, the communication interface 120 transmits at least one of analysis results with respect to the eye image or the view image obtained by the line of sight determining module 12 to the external server to request that the external server transmit the control information corresponding to the target object or the related device.

According to an embodiment of the present invention, upon receiving the request for transmitting the control information from the first electronic device 100, the external server determines whether the control information corresponding to the target object or the related device has been stored in the external server. If the control information has been stored in the external server, the external server transmits the control information to the communication interface 120 of the first electronic device 100. According to an embodiment of the present invention, if the control information has not been stored in the external server, the external server searches for another electronic device that has stored the control information through wired or wireless communication. The external server may download the latest control information based on the search result, and transmit the latest control information to the first electronic device 100. According to an embodiment of the present invention, the external server searches, for example, a portable site, for the control information corresponding to the target object or the related device, by using the analysis result received from the first electronic device 100.

The camera module 150 captures a still image or a moving image. According to an embodiment of the present invention, the camera module 150 generates an eye image by photographing eyes of the user 10 under control of the controller 110. The camera module 150 may generate a view image by photographing an image the user 10 currently views along the direction of the line of sight of the user 10. According to an embodiment of the present invention, the camera module 150 receives a gesture input from the user 10. The user 10 may input a particular gesture, which is a user input for controlling the first electronic device 101, the target object, or the related device, to the camera module 150 as the gesture input. The controller 110 may control at least one of the first electronic device 101, the target object, and the related device according to the gesture input inputted through the camera module 150.

According to an embodiment of the present invention, the electronic device 100 receives a voice input from the user 10 through a microphone. The user 10 may input a particular voice, which is a user input for controlling the first electronic device 101, the target object, or the related device, to the microphone as the voice input. The controller 110 may control at least one of the first electronic device 101, the target object, and the related device according to the voice input inputted through the microphone.

According to an embodiment of the present invention, the camera module 150 is implemented to include two or more cameras. Lenses of the respective two or more cameras may be oriented in different directions, such that the respective two or more cameras may photograph objects located in different directions. For example, a lens of a first camera may be oriented to face the user 10 and a lens of a second camera may be oriented in a direction that the user 10 views, to photograph objects located in front of the user 10. In another embodiment of the present invention, the camera module is implement with a single camera that is moveable to capture images in different directions.

According to an embodiment of the present invention, the camera module 150 is implemented with at least one image sensor. At least one image sensor may perform the same operations as the camera module 150. The camera module 150 or the image sensor may be functionally connected with the first electronic device 100, and thus may be included in the first electronic device 100 or located outside the first electronic device 100 to deliver an image to the controller 110 of the first electronic device 100.

The I/O module 160 receives a user input inputted from the user 10. According to an embodiment of the present invention, the I/O module 160 receives a user input for driving the first electronic device 100, a user input for controlling the target object or the related device located outside the first electronic device 100 through the first electronic device 100, a user input for driving the camera module 150, or the like.

The storing unit 175 stores various pieces of data for controlling the first electronic device 100. According to an embodiment of the present invention, the storing unit 175 stores various pieces of data for analyzing an eye image generated by the camera module 150, such as, for example, the size of the pupil, the degree to which the eyelid is closed, the angle and distance between the eye and the camera module 150, the facial image of the user 10, and so forth. The line of sight determining module 12 may determine the direction of the line of sight of the user 10 or the target object the user 10 currently views, by analyzing the eye image based on the data stored in the storing unit 175.

According to an embodiment of the present invention, the storing unit 175 stores a device list regarding the target object or the related device. Table 1 shows an example of the device list.

TABLE 1

| Device | Product Name | Firmware | Position (GPS) | Control History | ... |
|---|---|---|---|---|---|
| Device #1 | DKDK930D | vjadnpdj 1.03 | 23.12.01 | Exist | ... |
| Device #2 | WKSL10-192 | thdrkgh 2.1 | 23.12.02 | None | ... |
| ... | ... | ... | ... | ... | ... |

Referring to Table 1, a product name of Device #1 is DKDK930D, firmware stored in Device #1 is vjadnpdj, a version of the firmware is 1.03, and a position of Device #1 indicated by GPS coordinates is 21.12.01. As to Device #2, a product name is WKSL10-192, stored firmware is thdrkgh, a version of the firmware is 2.1, and a position indicated by GPS coordinates is 21.12.02. Device #1 has been controlled by the first electronic device 100, while Device #2 has never been controlled by the first electronic device 100.

The information determining module 14 determines whether the target object or the related device has already been registered in the first electronic device 100, based on the device list. The information determining module 14 also determines whether the target object or the related device has ever been controlled, based on the device list.

According to an embodiment of the present invention, the storing unit 175 is implemented to include the device DB 22. The device DB 22 may store, for example, a name or device code of the target object or related device and control information corresponding to the target object or related device. The controller 110 may determine whether control information corresponding to the second electronic device 200 is stored by referring to the device DB 22.

According to an aspect of the present invention, an electronic device is provided for controlling an external object. The electronic device includes a controller configured to determine a line of sight of a user using an image sensor of the electronic device, determine an object located outside of the electronic device based on the line of sight of the user, determine object information regarding the object, and generate a control signal for controlling the object or another electronic device associated with the object based on a user input with respect to the object and the object information, upon receiving the user input from the user; and a communication interface configured to transmit the control signal to the object or the other electronic device associated with the object.

According to another aspect of the present invention, an electronic device is provided for controlling an external object. The electronic device includes a camera module configured to capture an image of an eye of a user of the electronic device, and capture a view image in a direction that the user views; a controller configured to: determine a line of sight of the user based on the image of the eye of the user, select an object from the view image based on the line of sight of the user, and generate a control signal for controlling the object or another electronic device associated with the object based on a user input with respect to the object, upon receiving the user input from the user; and a communication interface configured to transmit the control signal to the object or the other electronic device associated with the object.

According to another aspect of the present invention, an electronic device is provided for controlling an external object. The electronic device includes a camera module configured to capture an image of an eye of a user of the electronic device; a controller configured to: determine a viewing point based on the image of the eye of the user, generate a control signal for controlling the object or another electronic device associated with the object based on a user input with respect to the object, upon receiving the user input from the user; and a communication interface configured to transmit the control signal to the object or the other electronic device associated with the object.

Figure 3:
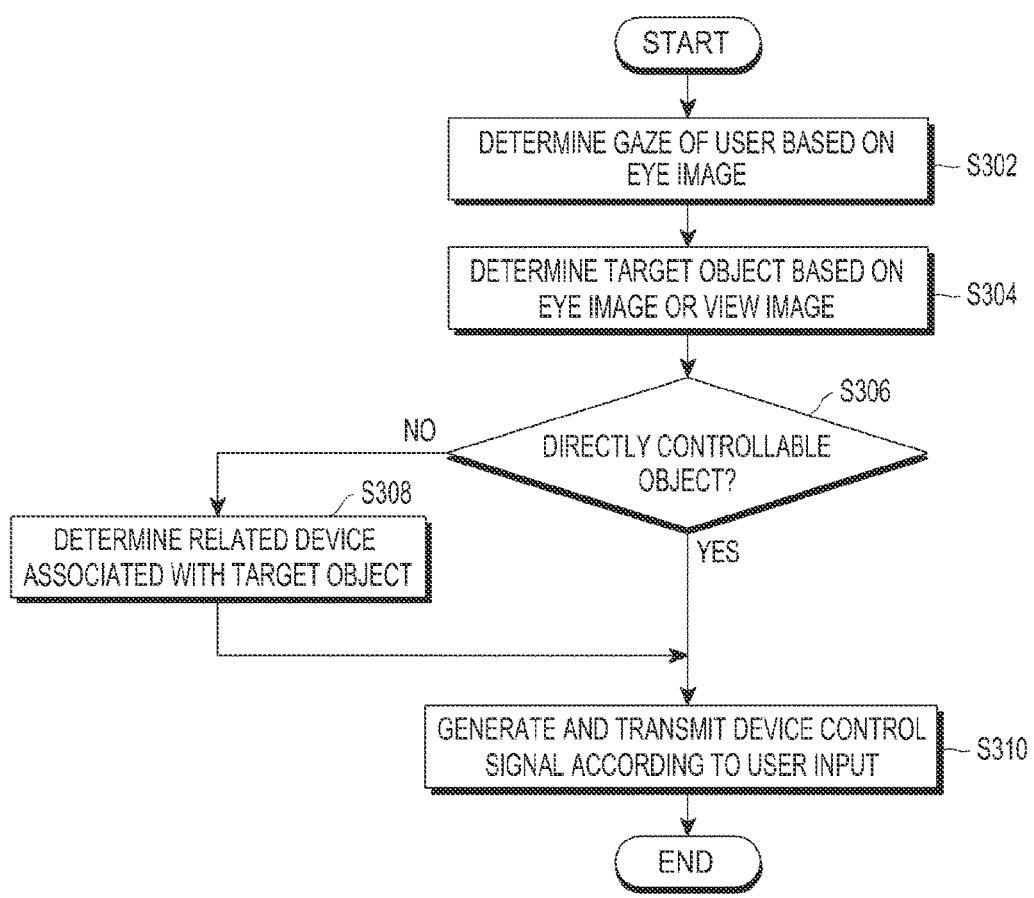
FIG. 3 is a flowchart illustrating a method for controlling a target object by a first electronic device, according to an embodiment of the present invention.

FIG. 3 is a flowchart illustrating a method for controlling a target object by a first electronic device, according to an embodiment of the present invention. In FIG. 3, it is assumed that a target object or an electronic device (related device) associated with the target object is the second electronic device 200.

Referring to FIG. 3, in step S302, the first electronic device 100 determines a line of sight of the user 10 based on an eye image. According to an embodiment of the present invention, the controller 110 controls the camera module 150 to photograph an eye of the user 10 and to generate an eye image prior to step S302. The controller 110 analyzes the eye image to determine a direction of the line of sight of the user 10. According to an embodiment of the present invention, after step S302, the controller 110 controls the camera module 150 to generate a view image. According to an embodiment of the present invention, the camera module 150 synchronizes coordinates of an image captured by a first camera for generating the eye image with coordinates of an image captured by a second camera for generating a view image. According to an embodiment of the present invention, coordinate synchronization between the first camera and the second camera may be performed after generation of the eye image and the view image, and before step S304.

According to an embodiment of the present invention, the controller 110 of the first electronic device 100 synchronizes coordinates of images captured by the first camera and the second camera along the line of sight of the user 10 after step S302. For example, the origin of the image captured by the second camera may be a point to which the line of sight of the user 10 is directed.

Once the line of sight of the user 100 is determined, the controller 110 determines a target object based on the eye image or the view image, in step S304. After the target object is determined, the controller 110 determines whether the target object is directly controllable, in step S306. According to an embodiment of the present invention, the target object may be an electronic device capable of communicating with the first electronic device 100 in a wired or wireless manner, the target object may not be an electronic device, or the target object may be an electronic device incapable of communicating with the first electronic device 100. Depending on whether the target object is an electronic device or not (or an electronic device incapable of communicating with the first electronic device 100), an operation of the first electronic device 100 for controlling the target object may vary. Thus, before generating a device control signal for controlling the target object, the first electronic device 100 determines whether the target object is directly controllable by the first electronic device 100. According to an embodiment of the present invention, if the target object is an electronic device capable of communicating with the first electronic device 100, the controller 110 determines that the target object is directly controllable by the first electronic device 100. According to an embodiment of the present invention, if the target object is not an electronic device or is an electronic device incapable of communicating with the first electronic device 100, then the controller 110 determines that the target object is an object that is not controllable by the first electronic device 100.

If the target object is a directly controllable object ('Yes' in step S306), the controller 110 generates and transmits the device control signal according to a user input, in step S310. According to an embodiment of the present invention, prior to step S310, the controller 110 generates a device control signal for pairing the target object with the first electronic device 100 and transmits the device control signal to the target object. According to an embodiment of the present invention, according to the device control signal for pairing, the first electronic device 100 is set as a master device and the target object is set as a slave device.

If it is determined that the target object is not controllable ('No' in step S306), the controller 110 determines a related device associated with the target object, in step S308. Since the target object is not controllable by the first electronic device 100, the controller 110 may determine, from the view image, an electronic device capable of changing a state of the target object as a related device. Once the related device is determined, the controller 110 may generate a device control signal for pairing the related device with the first electronic device 100, and transmit the device control signal to the related device. According to an embodiment of the present invention, the first electronic device 100 is set as a master device and the related device is set as a slave device, according to the device control signal for pairing.

The controller 110 generates a device control signal according to a user input inputted to the first electronic device 100, and transmits the generated device control signal to the related device, in step S310.

As such, by transmitting a device control signal to a target object or a related device associated with the target object, the first electronic device 100 may control the target object or the related device.

Figure 4:
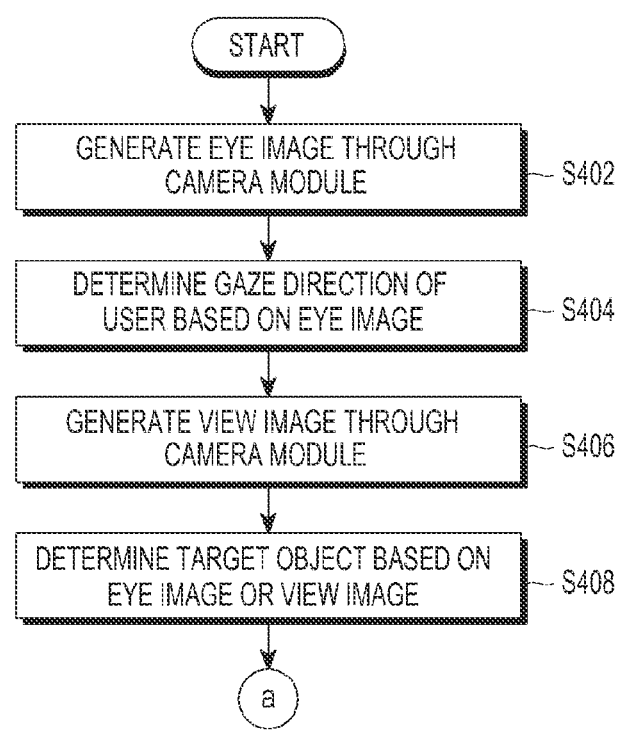
FIG. 4 is a flowchart illustrating a method for determining a target object by a first electronic device, according to an embodiment of the present invention.

FIG. 4 is a flowchart illustrating a method for determining a target object by a first electronic device, according to an embodiment of the present invention. In FIG. 4, the camera module 150 includes a first camera and a second camera, and a lens of the first camera and a lens of the second camera are installed in different directions.

Referring to FIG. 4, the controller 110 of the first electronic device 100 generates an eye image through the camera module 150, in step S402. The camera module 150 may generate an eye image by photographing an eye of the user 10 using at least one of the first camera and the second camera.

Once the eye image is generated, the controller 110 determines a direction of the line of sight of the user 10 based on the eye image, in step S404. Specifically, in step S404, the line of sight determining module 12 obtains data corresponding to an analysis of the eye image, such as, for example, the size of a pupil of the user 10, the degree to which an eyelid is closed, angle and distance between the eye and the camera module 150, a facial image of the user 10, and the like. In step S404, the line of sight determining module 12 determines the line of sight of the user 10 based on an analysis result with respect to the eye image. The line of sight of the user 10 may include a direction or angle of the line of sight, a point that the user 10 views, and so forth.

When the direction of the line of sight of the user 10 is determined, the controller 110 generates a view image through the camera module 150, in step S406. Specifically, in step S406, the camera module 150 generates a view image by photographing at least one object that the user 10 currently views with at least one of the first camera and the second camera.

When the view image is generated, the line of sight determining module 12 of the controller 110 determines the target object based on the eye image or the view image, in step S408. According to an embodiment of the present invention, the information determining module 14 of the controller 110 obtains recognition data from the view image, in step S408. The information determining module 14 may obtain object information including a device name of the target object, a product name of the target object, a brand name of the target object, and the like, by using the recognition data. Subsequent operations with respect to (a) are described in detail below with reference to FIG. 5.

Figure 5:
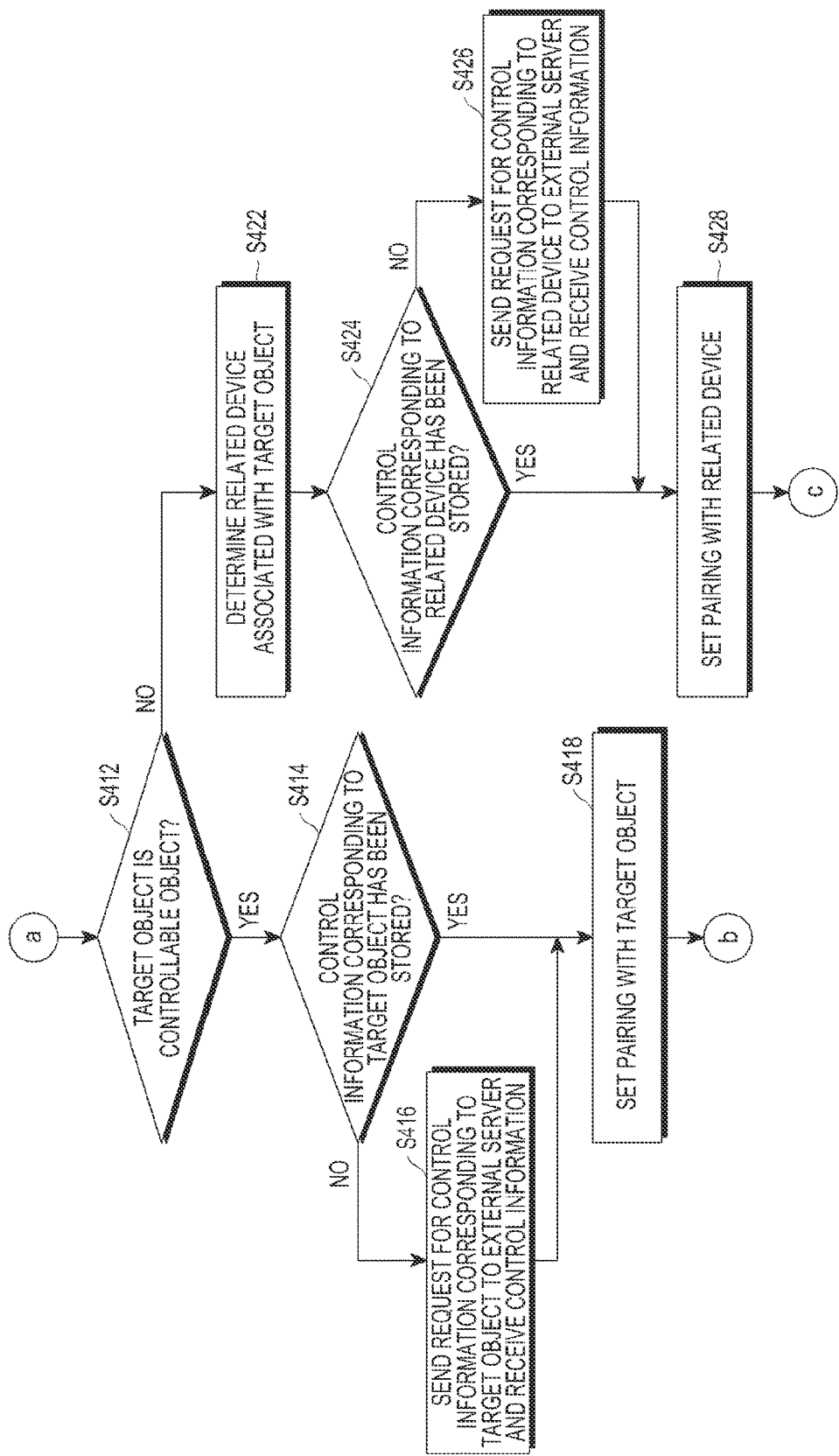
FIG. 5 is a flowchart illustrating a method for setting up a connection with a target object by a first electronic device, according to an embodiment of the present invention.

FIG. 5 is a flowchart illustrating a method for setting up connection with a target object by a first electronic device, according to an embodiment of the present invention.

Referring to FIG. 5, the information determining module 14 of the controller 110 determines whether the target object is a controllable object that is able to be controlled by the first electronic device 100, in step S412.

If it is determined that the target object is a controllable object ('Yes' in step S412), the information determining module 14 determines whether control information corresponding to the target object has been stored in the storing unit 175, in step S414. According to an embodiment of the present invention, the control information includes a conversion function for converting a command of the first electronic device 10, which instructs the target object to perform a particular operation, into a format suitable for the target object.

If the control information corresponding to the target object has been stored in the storing unit 175 ('Yes' in step S414), the controller 110 sets a pairing with the target object based on the control information, in step S418. According to an embodiment of the present invention, the controller 110 transmits a device control signal to the target object for setting the first electronic device 100 as a master device and setting the target object as a slave device, thus performing the operation of setting a pairing between the first electronic device 100 and the target object.

If it is determined that the control information corresponding to the target object has not been stored in the storing unit 175 ('No' in step S414), the controller 110 controls the communication interface 120 to send a request to an external device for the control information corresponding to the target object and to receive the control information, in step S416. According to an embodiment of the present invention, the controller 110 stores the received control information received in the storing unit 175. The controller 110 may add the control information to a device list to update the device list. As such, once the control information is received, the controller 110 sets a paring between the first electronic device 100 and the target object based on the control information, in step S418.

If it is determined that the target object is not controllable ('No' in step S412), the information determining module 14 determines a related device associated with the target object, in step S422. According to an embodiment of the present invention, the information determining module 14 determines a related device associated with the target object by using the recognition data or the device list obtained from the view image.

Once the related device is determined, the information determining module 14 of the controller 110 determines whether control information corresponding to the related device has been stored in the storing unit 175, in step S424. According to an embodiment of the present invention, the control information includes a conversion function for converting a command of the first electronic device 10, instructing the target object to perform a particular operation, into a format suitable for the target object.

If it is determined that the control information corresponding to the related device has been stored in the storing unit 175 ('Yes' in step S424), the controller 110 sets a pairing with the related device based on the control information, in step S428. According to an embodiment of the present invention, the controller 110 transmits a device control signal to the related device for setting the first electronic device 100 as a master device and setting the related device as a slave device, thus performing the operation of setting a pairing between the first electronic device 100 and the related device.

If it is determined that the control information corresponding to the related device has not been stored in the storing unit 175 ('No' in step S424), the controller 110 controls the communication interface 120 to send, to an external device, a request for the control information corresponding to the related device and to receive the control information, in step S426. According to an embodiment of the present invention, the controller 110 stores the control information received in step S426 in the storing unit 175. The controller 110 may add the control information to a device list to update the device list. As such, once the control information is received, the controller 110 sets a paring between the first electronic device 100 and the related device based on the control information, in step S428.

Figure 6A:
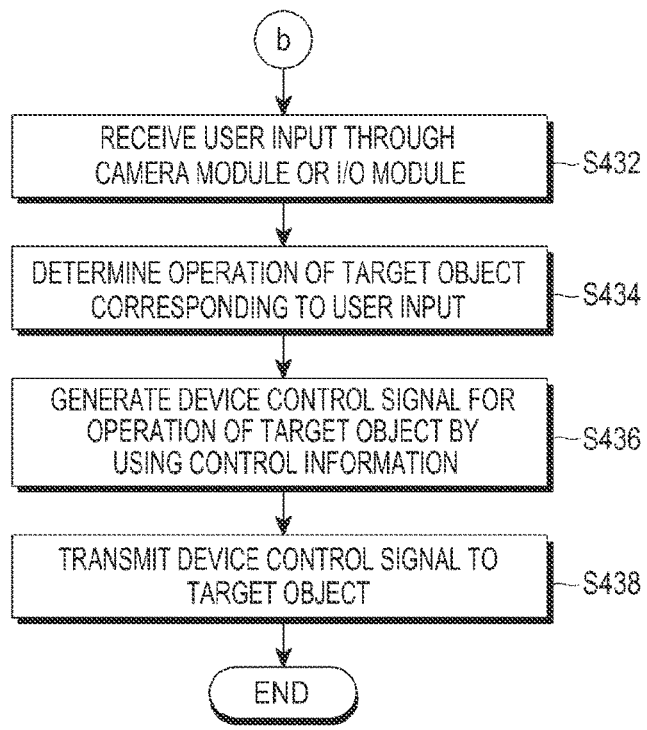
FIG. 6A is a flowchart illustrating a method for controlling a target object by a first electronic device, according to an embodiment of the present invention.
Figure 6B:
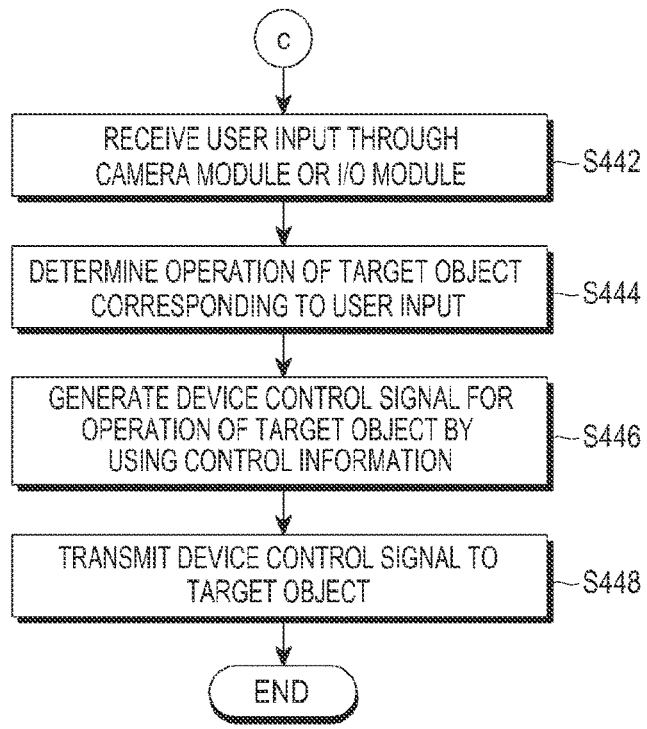
FIG. 6B is a flowchart illustrating a method for changing a state of a target object by controlling a related device by a first electronic device, according to an embodiment of the present invention.

Subsequent operations corresponding to (b) and (c) are described in detail below with reference to FIGS. 6A and 6B, respectively. FIG. 6A is a flowchart illustrating a method for controlling a target object by a first electronic device, according to an embodiment of the present invention, and FIG. 6B is a flowchart illustrating a method for changing a state of a target object by controlling a related device by a first electronic device, according to an embodiment of the present invention.

Referring to FIG. 6A, the first electronic device 100 receives a user input from the user 10 through the camera module 150 or the I/O module 160, in step S432. According to an embodiment of the present invention, the camera module 150 receives a gesture input from the user 10 by using at least one of the first camera and the second camera. According to an embodiment of the present invention, the I/O module 160 may be implemented to include a microphone (MIC) and may receive a voice input from the user through the MIC.

Once the user input is received, the signal generating module 16 of the controller 110 determines an operation of the target object corresponding to the user input, in step S434. The signal generating module 16 generates a device control signal for the operation of the target object by using control information, in step S436. After the device control signal is generated, the signal generating module 16 transmits the device control signal to the target object through the communication interface 120, in step S438.

For example, assuming that the target object is a TV and the user 10 requests the first electronic device 100 to change a channel through the user input, the controller 110 of the first electronic device 100 determines an operation of the TV changing the channel as corresponding to the user input. The signal generating module 16 generates a device control signal including a command requesting change of the channel of the target object, the TV, according to the user input. According to an embodiment of the present invention, the TV receives the device control signal from the first electronic device 100 and changes the channel according to the device control signal.

Referring to FIG. 6B, the first electronic device 100 receives a user input from the user 10 through the camera module 150 or the I/O module 160, in step S442. According to an embodiment of the present invention, the camera module 150 receives a gesture input from the user 10 through at least one of the first camera and the second camera. According to an embodiment of the present invention, the I/O module 160 is implemented to include a MIC and receives a voice input from the user 10 through the MIC.

When the user input is received, the signal generating module 16 of the controller 110 determines an operation of a related device corresponding to the user input, in step S444. The signal generating module 16 generates a device control signal for the operation of the related device by using control information, in step S446. Once the device control signal is generated, the signal generating module 16 transmits the device control signal to the related device through the communication interface 120, in step S448.

For example, assuming that the target object is garbage and a related device associated with the target object is a cleaning robot, the user 10 requests the first electronic device 100 to remove the garbage through a user input. The controller 110 of the first electronic device 100 determines an operation of the cleaning robot performing cleaning to remove the garbage as corresponding to the user input. The signal generating module 16 generates a device control signal including a command requesting the cleaning robot to perform cleaning so as to remove the garbage. According to an embodiment of the present invention, the cleaning robot, receives the device control signal from the first electronic device 100, and removes the garbage, by performing cleaning according to the device control signal. That is, the cleaning robot changes a current state of the garbage.

Figure 7A:
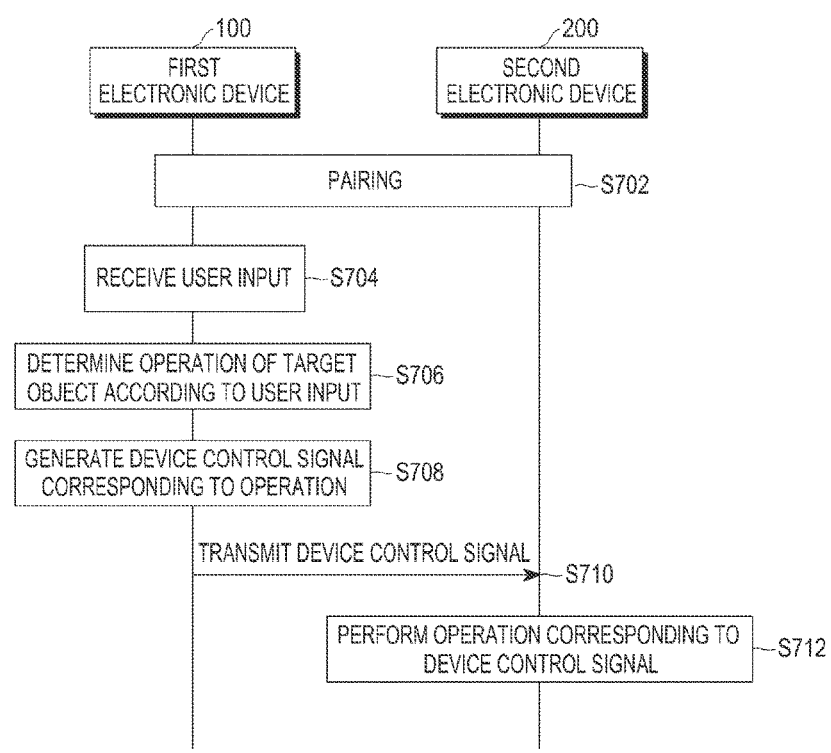
FIG. 7A is a flowchart illustrating a method for controlling a target object by a first electronic device paired with the target object, according to an embodiment of the present invention.

FIG. 7A is a flowchart illustrating a method for controlling a target object by a first electronic device paired with the target object, according to an embodiment of the present invention. In FIG. 7A, it is assumed that the second electronic device 200 is a target object.

Referring to FIG. 7A, the first electronic device 100 and the second electronic device 200 are paired with each other, in step S702. According to an embodiment of the present invention, in step S702, the first electronic device 100 establishes a connection to set the first electronic device 100 as a master device and the second electronic device 200 as a slave device.

Once the pairing is completed, the first electronic device 100 receives a user input for controlling the operation of the second electronic device 200 from the user 10, in step S704. The first electronic device 100 determines an operation of the target object corresponding to the user input, in step S706. The first electronic device 100 generates a device control signal corresponding to the operation, in step S708.

When the device control signal for controlling the second electronic device 200 is generated, the first electronic device 100 transmits the device control signal to the second electronic device 200, in step S710. The second electronic device 200 having received the device control signal from the first electronic device 100 performs an operation corresponding to the device control signal, in step S712. In this way, the first electronic device 100 is able to control the operation of the second electronic device 200 according to the user input.

Figure 7B:
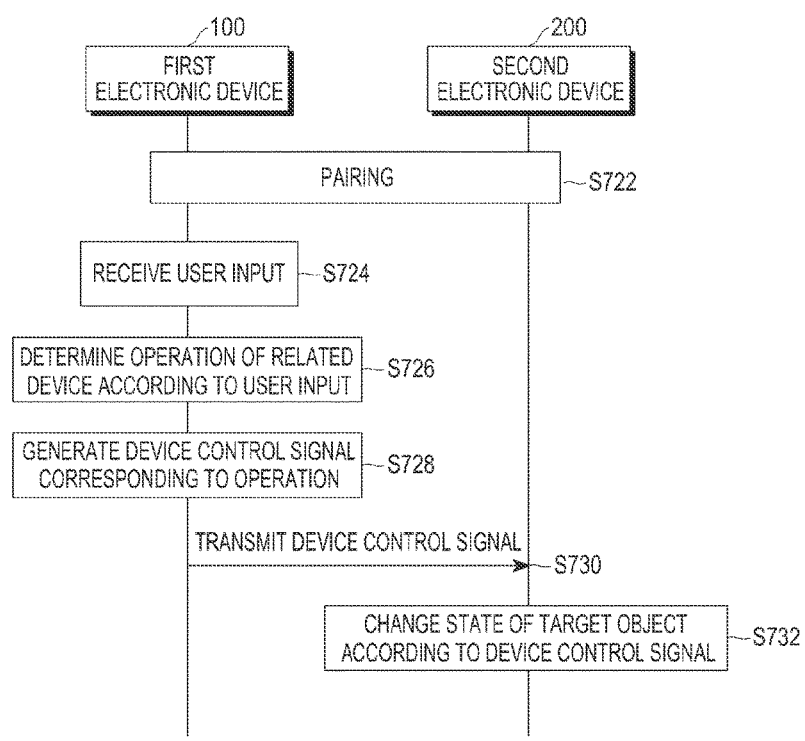
FIG. 7B is a flowchart illustrating a method for controlling a related device associated with a target object by a first electronic device paired with the target object, according to an embodiment of the present invention.

FIG. 7B is a flowchart illustrating a method for controlling a related device associated with a target object by a first electronic device paired with the target object, according to an embodiment of the present invention. In FIG. 7B, it is assumed that the second electronic device 200 is a related device.

Referring to FIG. 7B, the first electronic device 100 and the second electronic device 200 are paired with each other, in step S722. According to an embodiment of the present invention, the first electronic device 100 establishes a connection to set the first electronic device 100 as a master device and the second electronic device 200 as a slave device.

Once the pairing is completed, the first electronic device 100 receives a user input for changing a state of a target object from the user 10, in step S724. The first electronic device 100 determines an operation of the related device corresponding to the user input, in step S726. The first electronic device 100 generates a device control signal corresponding to the operation, in step S728.

When the device control signal for controlling the second electronic device 200 is generated in operation S728, the first electronic device 100 transmits the device control signal to the second electronic device 200, in step S730. The second electronic device 200, having received the device control signal from the first electronic device 100, performs an operation corresponding to the device control signal, in step S732. When the second electronic device 200 performs the operation corresponding to the device control signal, the second electronic device 200 is able to change the state of the target object according to the user input.

According to an aspect of the present invention, a method is provided for controlling an external object by an electronic device. The method includes determining, by the electronic device, a line of sight of a user using an image sensor of the electronic device; determining, by the electronic device, an object located outside of the electronic device based on the line of sight of the user; determining, by the electronic device, object information regarding the object; receiving, at the electronic device, a user input with respect to the object from the user; and controlling, by the electronic device, the object or another electronic device associated with the object based on the user input and the object information.

According to another aspect of the present invention, a method is provided for controlling an external object by an electronic device. The method includes capturing, by the electronic device, an image of an eye of a user of the electronic device; determining, by the electronic device, a line of sight of the user based on the image of the eye of the user; capturing, by the electronic device, a view image in a direction that the user views; selecting, by the electronic device, an object from the view image based on the line of sight of the user; receiving, at the electronic device, a user input with respect to the object from the user; and controlling, by the electronic device, the object or another electronic device associated with the object based on the user input.

According to another aspect of the present invention, a method is provided for controlling an external object by an electronic device. The method includes capturing, by the electronic device, an image of an eye of a user of the electronic device; determining, by the electronic device, a viewing point based on the image of the eye of the user; determining, by the electronic device, an object corresponding to a coordinate of the viewing point; receiving, at the electronic device, a user input with respect to the object from the user; and controlling, by the electronic device, the object or another electronic device associated with the object based on the user input.

Figure 8:
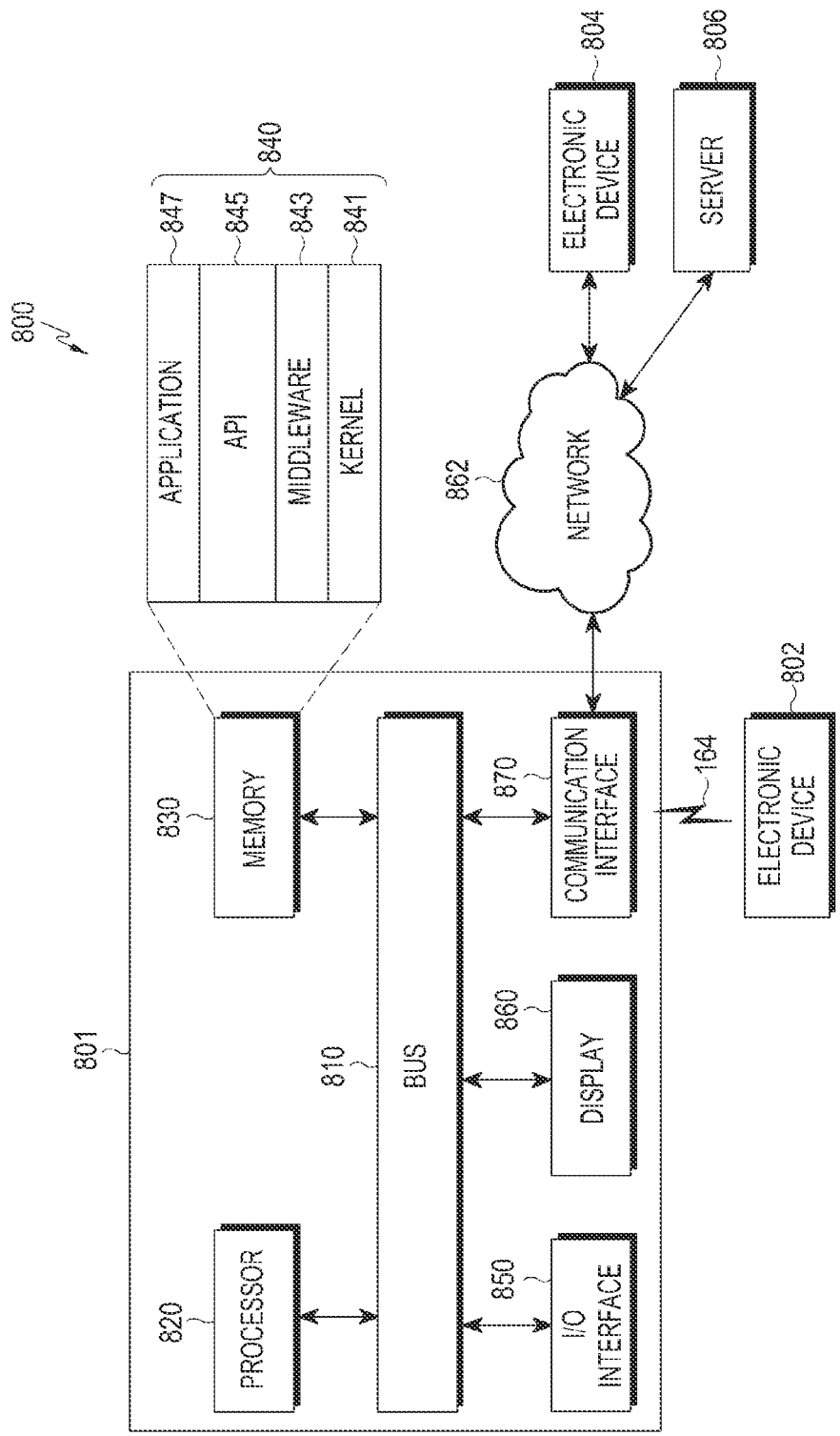
FIG. 8 is a diagram illustrating a network environment including a first electronic device, according to an embodiment of the present invention.

FIG. 8 is a diagram illustrating a network environment including a first electronic device, according to an embodiment of the present invention.

Referring to FIG. 8, a network environment 800 includes a first electronic device 801 having a bus 810, a processor 820, a memory 830, an Input/Output (I/O) interface 850, a display 860, and a communication interface 870. According to an embodiment of the present invention, the electronic device 801 may omit at least one of the foregoing elements or may further include other elements.

The bus 810 may include a circuit for interconnecting the elements 810 through 870 described above and for enabling communication (for example, a control message and/or data) between the elements described above.

The processor 820 may include one or more of a Central Processing Unit (CPU), an Application Processor (AP), and a Communication Processor (CP). The processor 820 performs operations or data processing for control and/or communication of, for example, at least one other element of the electronic device 801. According to an embodiment of the present invention, the processor 820 performs all operations of the controller 110 illustrated in FIG. 2.

The processor 820 analyzes a line of sight of the user 10 to determine a target object, which the user 10 currently views, for example, a second electronic device (for example, the electronic device 802 or 804). Upon determining the target object, the processor 820 controls the first electronic device 801 to be paired with the target object based on control information corresponding to the target object. Once the first electronic device 801 and the second electronic device are connected with each other, the processor 820 generates a device control signal corresponding to a user input that is input through a camera module or the I/O interface 850. When the device control signal is generated, the processor 820 controls the communication interface 870 to transmit the device control signal to the second electronic device. According to an embodiment of the present invention, the second electronic device receives the device control signal from the first electronic device 801 and performs an operation corresponding to the device control signal.

The memory 830 may include a volatile and/or nonvolatile memory. The memory 830 may store, for example, commands or data associated with at least one other element of the electronic device 801. According to an embodiment of the present invention, the memory 830 stores software and/or a program 840. The program 840 includes, for example, a kernel 841, middleware 843, an Application Programming Interface (API) 845, and/or an application program (or an application) 847. At least some of the kernel 841, the middleware 843, and the API 845 may be referred to as an Operating System (OS).

The kernel 841 controls or manages, for example, system resources (for example, the bus 810, the processor 820, or the memory 830) used to execute an operation or a function implemented in other programs (for example, the middleware 843, the API 845, or the application program 847). The kernel 841 provides an interface through which the middleware 843, the API 845, or the application program 847 accesses separate components of the electronic device 801 to control or manage the system resources.

The middleware 843 may work as an intermediary for allowing, for example, the API 845 or the application program 847 to exchange data in communication with the kernel 841. In regard to task requests received from the application program 847, the middleware 843 performs control (for example, scheduling or load balancing) with respect to the task requests, for example, by giving priorities for using a system resource (for example, the bus 810, the processor 820, or the memory 830) of the electronic device 801 to at least one of the application programs 847.

The API 845 is an interface used for the application 847 to control a function provided by the kernel 841 or the middleware 843, and may include, for example, at least one interface or function (for example, a command) for file control, window control, image processing or character control.

The I/O interface 850 serves as an interface for delivering a command or data input from a user or another external device to other component(s) 810, 820, 830, 840, 860, and 870 of the electronic device 801. The I/O interface 850 may also output a command or data received from other component(s) 810, 820, 830, 840, 860, and 870 of the electronic device 801 to a user or another external device.

The display 860 may include, for example, a Liquid Crystal Display (LCD), a Light Emitting Diode (LED) display, an Organic Light Emitting Diode (OLED) display, a MicroElectroMechanical System (MEMS) display, or an electronic paper display. The display 860 may display various contents (for example, a text, an image, video, an icon, or a symbol) to users. The display 860 may include a touch screen, and receives a touch, a gesture, proximity, or a hovering input, for example, by using an electronic pen or a part of a body of a user.

According to an embodiment of the present invention, the display 860 may display various contents provided by the electronic device 801 in the form of a stereoscopic image, thereby providing a virtual reality service to the user.

The communication interface 870 sets up communication between the electronic device 801 and an external device (for example, a first external electronic device 802, a second external electronic device 804, or a server 806). For example, the communication interface 870 is connected to a network 862 through wireless or wired communication to communicate with the external device (for example, the second external electronic device 804 or the server 806).

The wireless communication may use, as a cellular communication protocol, for example, at least one of Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM)). The wired communication may include, for example, at least one of a Universal Serial Bus (USB), a High Definition Multimedia Interface (HDMI), a Recommended Standard (RS)-232, and a Plain Old Telephone Service (POTS). The network 862 may include a telecommunications network, for example, at least one of a computer network (for example, a Local Area Network (LAN) or a Wide Area Network (WAN)), Internet, and a telephone network.

Each of the first external electronic device 802 and the second external electronic device 804 may be a device of the same type as or of a different type than the electronic device 801. According to an embodiment of the present invention, the server 806 may include a group of one or more servers.

According to an embodiment of the present invention, some or all of operations performed by the electronic device 801 may be performed in one or more other electronic devices (for example, the electronic devices 802 and 804 or the server 806). According to an embodiment of the present invention, when the electronic device 801 has to perform a function or a service automatically or upon request, the electronic device 801 requests another device (for example, the electronic device 802 or 804 or the server 806) to execute at least some functions associated with the function or the service, in place of or in addition to executing the function or the service. The other electronic device (for example, the electronic device 802 or 804 or the server 806) executes the requested function or additional function and delivers the execution result to the electronic device 801. The electronic device 801 then processes or further processes the received result to provide the requested function or service. To this end, for example, cloud computing, distributed computing, or client-server computing may be used.

The first electronic device 801 may further include a camera module. The camera module may include a first camera or a second camera, which capture a still image or a moving image under control of the processor 820. The first camera or the second camera may include an auxiliary light source (for example, a flash) for providing light necessary for photographing. The first camera may be positioned on a front surface of the first electronic device 801, and the second camera may be positioned on a rear surface of the first electronic device 801. In another embodiment of the present invention, the first camera and the second camera may be positioned adjacent to each other (for example, a space between the first camera and the second camera is greater than 1 cm and less than 8 cm) to capture a three-dimensional (3D) still image or a 3D moving image.

The camera module captures eyes of a user 10 under control of the processor 820 to generate an eye image. The camera module captures an image the user 10 currently views along a direction of a line of sight of the user 10 to generate a view image.

Figure 9:
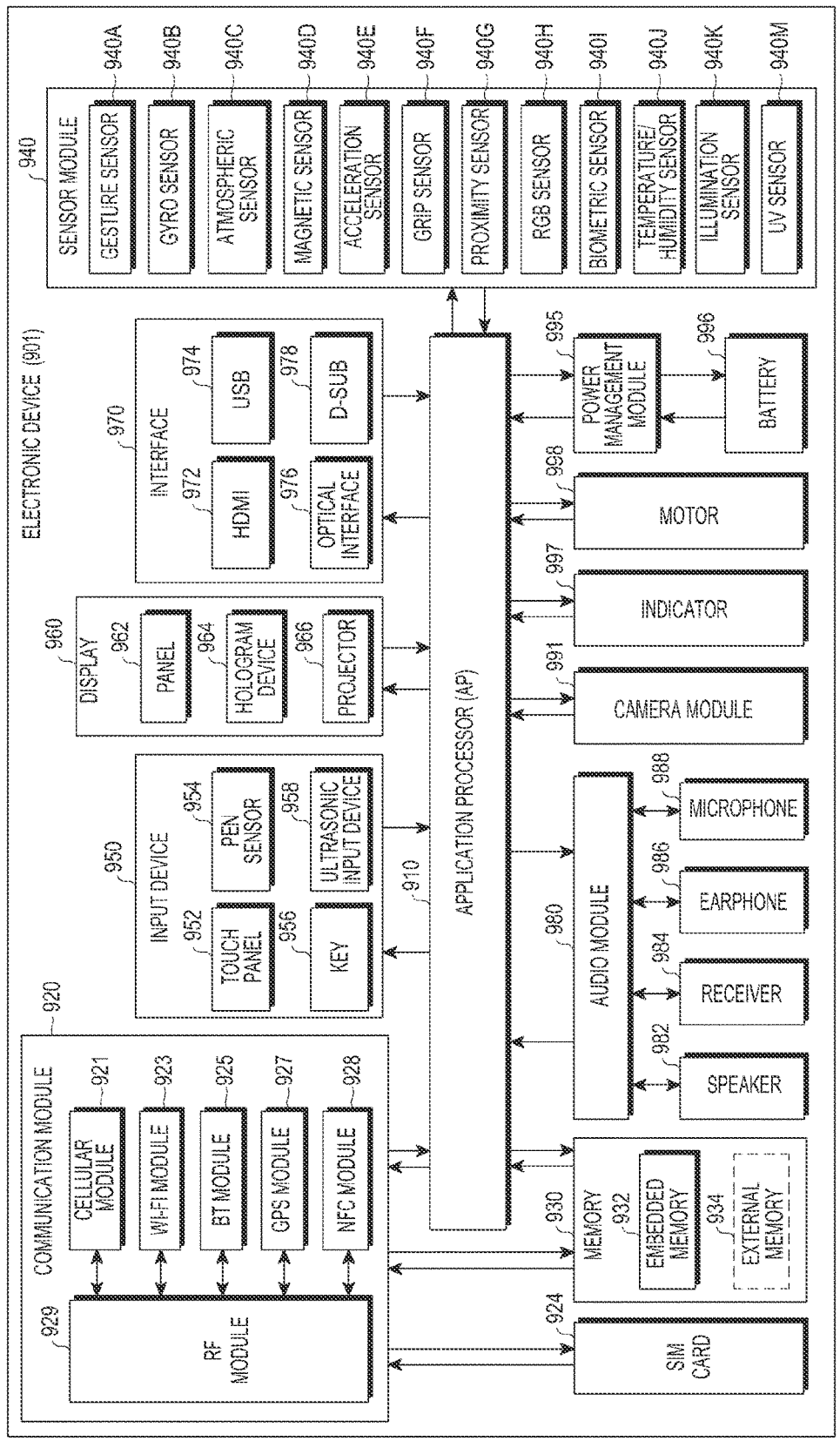
FIG. 9 is a block diagram illustrating an electronic device, according to an embodiment of the present invention.

FIG. 9 is a block diagram of an electronic device, according to an embodiment of the present invention.

An electronic device 901 may include all or a part of, for example, the electronic device 801 illustrated in FIG. 8. The electronic device 901 includes one or more Application Processors (APs) 910, a communication module 920, a Subscriber Identification Module (SIM) card 924, a memory 930, a sensor module 940, an input device 950, a display 960, an interface 970, an audio module 980, a camera module 991, a power management module 995, a battery 996, an indicator 997, and a motor 998.

The AP 910 controls multiple hardware or software elements connected to the AP 910 or performs various data processing or operations, for example, by driving an OS or an application program. The AP 910 may be implemented, for example, with a System on Chip (SoC). According to an embodiment of the present invention, the AP 910 may further include a Graphic Processing Unit (GPU) and/or an Image Signal Processor (ISP). The AP 910 may include at least some of the elements illustrated in FIG. 8, such as, for example, a cellular module 921. The AP 910 loads a command or data received from at least one other element (for example, a nonvolatile memory) into a volatile memory to process the command or data, and stores various data in the nonvolatile memory.

The communication module 920 may have a configuration that is the same as or similar to that of the communication interface 860 of FIG. 8. The communication module 920 includes, for example, the cellular module 921, a Wireless Fidelity (Wi-Fi) module 923, a Bluetooth (BT) module 925, a Global Positioning System (GPS) module 927, a Near Field Communication (NFC) module 928, and a Radio Frequency (RF) module 929.

The cellular module 921 provides voice communication, video communication, a text service, or an Internet service over a communication network. According to an embodiment of the present invention, the cellular module 921 performs identification and authentication with respect to the electronic device 901 in a communication network by using a subscriber identification module (for example, the SIM card 924). According to an embodiment of the present invention, the cellular module 921 performs at least some of functions that may be provided by the AP 910. According to an embodiment of the present invention, the cellular module 921 includes a Communication Processor (CP).

Each of the Wi-Fi module 923, the BT module 925, the GPS module 927, and the NFC module 928 may include a processor for processing data transmitted and received therethrough. According to an embodiment of the present invention, at least some (for example, two or more) of the cellular module 921, the Wi-Fi module 923, the BT module 925, the GPS module 927, and the NFC module 928 may be integrated into a single Integrated Chip (IC) or IC package.

The RF module 929 transmits and receives a communication signal (for example, an RF signal). The RF module 929 may include, for example, a transceiver, a Power Amp Module (PAM), a frequency filter, a Low Noise Amplifier (LNA), or an antenna. According to another embodiment of the present invention, at least one of the cellular module 921, the Wi-Fi module 923, the BT module 925, the GPS module 927, and the NFC module 928 transmits and receives an RF signal through a separate RF module.

The SIM card 924 may include, for example, a card including an SIM and/or an embedded SIM, and may include unique identification information (for example, an Integrated Circuit Card Identifier (ICCID)) or subscriber information (for example, an International Mobile Subscriber Identity (IMSI)).

The memory 930 (for example, the memory 830) includes, for example, an embedded memory 932 or an external memory 934. The embedded memory 932 may include, for example, at least one of a volatile memory (for example, a Dynamic Random Access Memory (DRAM) or Synchronous Dynamic RAM (SDRAM), a nonvolatile memory (for example, an One Time Programmable ROM (OTPROM), a Programmable ROM (PROM), an Erasable and Programmable ROM (EPROM), an Electrically Erasable and Programmable ROM (EEPROM), a mask ROM, a flash ROM, or a flash memory (such as a NAND flash or a NOR flash)), a hard drive, and a Solid State Drive (SSD).

The external memory 934 may further include a flash drive, such as, for example, a Compact Flash (CF), a Secure Digital (SD), a micro-Secure Digital (SD), a mini-SD, an Extreme Digital (xD), or a memory stick. The external memory 934 may be functionally and/or physically connected with the electronic device 901 through various interfaces.

The sensor module 940 measures a physical amount or senses an operation status of the electronic device 901 to convert the measured or sensed information into an electric signal. The sensor module 940 includes, for example, at least one of a gesture sensor 940A, a gyro sensor 940B, an atmospheric sensor 940C, a magnetic sensor 940D, an acceleration sensor 940E, a grip sensor 940F, a proximity sensor 940G, a color sensor 940H (for example, a Red, Green, Blue (RGB) sensor), a biometric sensor 940I, a temperature/humidity sensor 940J, an illumination sensor 940K, and an Ultra Violet (UV) sensor 940M. Additionally or alternatively, the sensor module 940 may further include an E-nose sensor, an Electromyography (EMG) sensor, an ElectroEncephaloGram (EEG) sensor, an ElectroCardioGram (ECG) sensor, an Infrared (IR) sensor, an iris sensor, and/or a fingerprint sensor, which may also be included as a part of the biometric sensor 940I. The sensor module 940 may further include a control circuit for controlling at least one sensor included therein. According to an embodiment of the present invention, the electronic device 901 further includes a processor configured to control the sensor module 940 as a part of or separately from the AP 910, and to control the sensor module 940 when the AP 910 is in a sleep status.

The input device 950 includes, for example, a touch panel 952, a (digital) pen sensor 954, a key 956, or an ultrasonic input device 958. The touch panel 952 may use, for example, at least one of a capacitive type, a resistive type, an IR type, and an ultrasonic type. The touch panel 952 may further include a control circuit. The touch panel 952 may further include a tactile layer to provide tactile reaction to a user.

The (digital) pen sensor 954 may be, for example, a part of a touch panel or a separate recognition sheet. The key 256 may include, for example, a physical button, an optical key, or a keypad. The ultrasonic input device 958 may sense audio waves and check data through a microphone (MIC) 988 in the electronic device 901 through an input means for generating an ultrasonic signal.

The display 960 (for example, the display 860) includes a panel 962, a hologram device 964, or a projector 966. The panel 962 may have a configuration that is the same as or similar to that of the display 860 of FIG. 8. The panel 962 may be implemented as, for example, being flexible, transparent, or wearable. The panel 962 may be configured as a single module with the touch panel 952. The hologram device 964 shows a cubic image in the air by using interference of light. The projector 966 displays an image by projecting light onto a screen that may be positioned, for example, inside or outside the electronic device 901. According to an embodiment of the present invention, the display 960 may further include a control circuit for controlling the panel 962, the hologram device 964, or the projector 966.

The interface 970 includes, for example, a High-Definition Multimedia Interface (HDMI) 972, a Universal Serial Bus (USB) 974, an optical interface 976, or a D-subminiature (sub) 978. The interface 970 may be included in, for example, the communication interface 870 illustrated in FIG. 8. Additionally or alternatively, the interface 970 may include, for example, a Mobile High-Definition Link (MHL) interface, a Secure Digital (SD) card/Multi-Media Card (MMC) interface, or an Infrared Data Association (IrDA) standard interface.

The audio module 980 interchangeably converts sound and an electric signal. At least some components of the audio module 980 may be included in, for example, the I/O interface 840 illustrated in FIG. 8. The audio module 980 may process sound information that is input or output through a speaker 982, a receiver 984, an earphone 986, or the microphone 988.

The camera module 991 is a device capable of capturing a still image and a moving image. According to an embodiment of the present invention, the camera module includes one or more image sensors (for example, a front sensor or a rear sensor), a lens, an ISP, or a flash (for example, an LED or a xenon lamp).

The power management module 995 manages power of the electronic device 901. According to an embodiment of the present invention, the power management module 995 includes a Power Management Integrated Circuit (PMIC), a charger IC, or a battery gauge. The PMIC may use a wired and/or wireless charging scheme. The wireless charging scheme may include, for example, a magnetic resonance scheme, a magnetic induction scheme, or an electromagnetic wave scheme, and an additional circuit for wireless charging, for example, a coil loop, a resonance circuit, or a rectifier may be further included. The battery gauge measures the remaining capacity of the battery 996, and a voltage, a current, or a temperature of the battery 996 during charging. The battery 996 may include, for example, a rechargeable battery and/or a solar battery.

The indicator 997 displays a specific status, such as a booting status, a message status, or a charging status, of the electronic device 901 or a part thereof (for example, the AP 910). The motor 998 converts an electric signal into mechanical vibration, and generates vibration or a haptic effect.

Although not shown, a processing device (for example, a GPU) for supporting a mobile TV may be included. The processing device for supporting the mobile TV processes media data complying with the standard such as Digital Multimedia Broadcasting (DMB), Digital Video Broadcasting (DVB), or a media flow.

Each of the above-described elements of the electronic device 901 may include one or more components, and the name of the element may vary with a type of the electronic device 901. According to an embodiment of the present invention, the electronic device 901 includes at least one of the above-described elements, and some elements may be omitted or other elements may be further included. Also, some of the elements of the electronic device 901, according to an embodiment of the present invention, may be coupled into one entity to perform the same functions as those of the elements before coupled.

Figure 10:
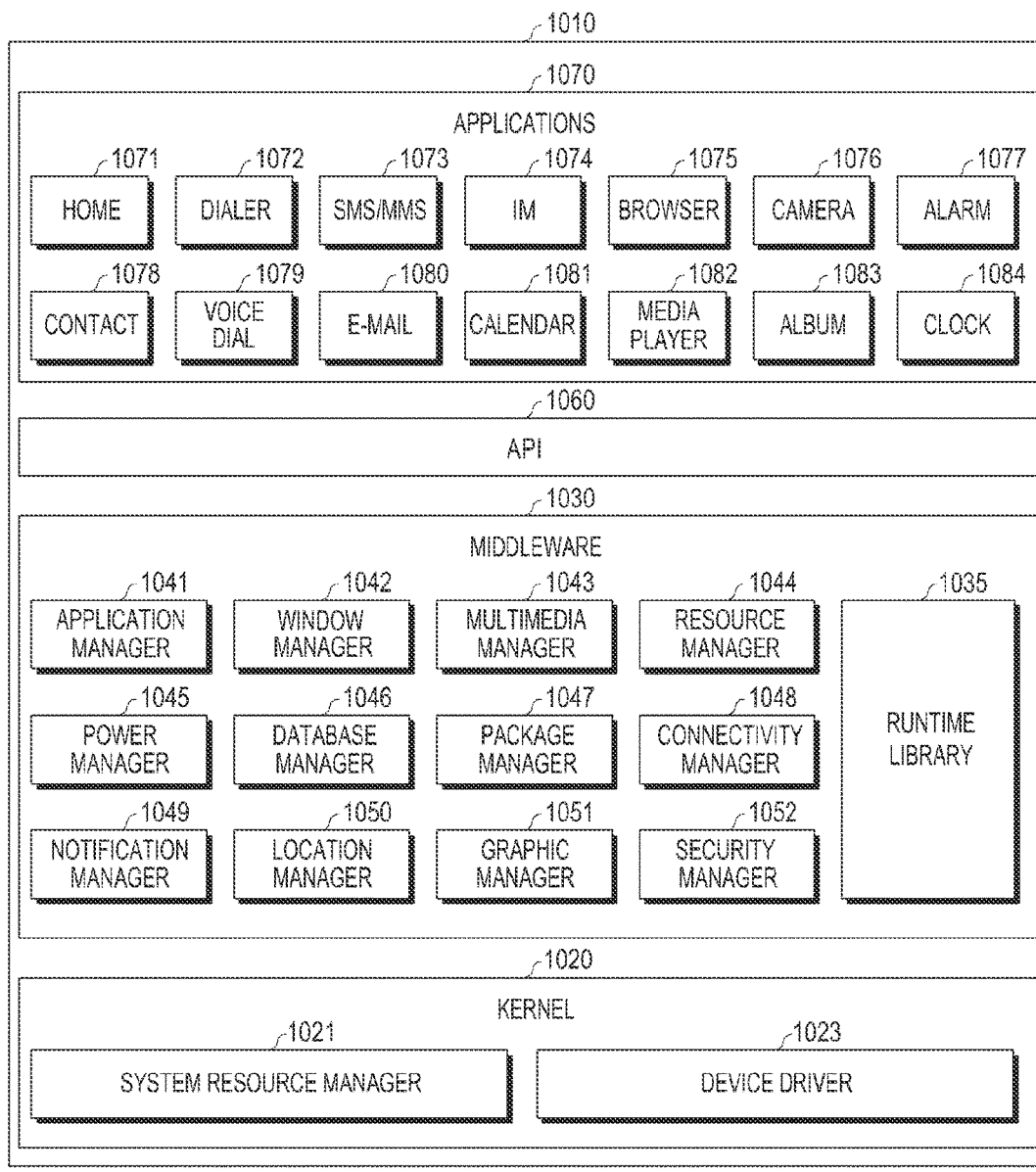
FIG. 10 is a block diagram illustrating a program module, according to an embodiments of the present invention.

FIG. 10 is a block diagram of a program module, according to an embodiment of the present invention.

According to an embodiment of the present invention, a program module 1010 (for example, the program 840) may include an OS for controlling resources related to an electronic device (for example, the electronic device 801) and/or various applications (for example, the application programs 847) driven on the OS.

The program module 1010 includes a kernel 1020, middleware 1030, an API 1060, and/or applications 1070. At least a part of the program module 1010 may be preloaded on an electronic device or may be downloaded from a server (for example, the server 806).

The kernel 1020 (for example, the kernel 841 of FIG. 8) includes a system resource manager 1021 and/or a device driver 1023. The system resource manager 1021 controls, allocates, or collects system resources. The system resource manager 1021 may include, for example, a process manager, a memory manager, and a file system manager. The device driver 1023 may include, for example, a display driver, a camera driver, a Bluetooth driver, a shared memory driver, a USB driver, a keypad driver, a WiFi driver, an audio driver, or an Inter-Process Communication (IPC) driver.

The middleware 1030 provides functions commonly necessary for the applications 1070, or provides various functions to the applications 1070 through the API 1060, such that the applications 1070 may efficiently use restricted system resources within the electronic device. According to an embodiment of the present invention, the middleware 1030 (for example, the middleware 843) includes at least one of a runtime library 1035, an application manager 1041, a window manager 1042, a multimedia manager 343, a resource manager 1044, a power manager 1045, a database manager 1046, a package manager 1047, a connectivity manager 1048, a notification manager 1049, a location manager 1050, a graphic manager 1051, and a security manager 1052.

The runtime library 1035 may include a library module that a compiler uses in order to add a new function through a programming language during execution of one of the applications 1070. According to an embodiment of the present invention, the runtime library 1035 performs an input/output, memory management, and/or a function for an arithmetic function.

The application manager 1041 manages a life cycle of at least one of the applications 1070. The window manager 1042 manages GUI resources used by a screen. The multimedia manager 1043 detects formats used for reproduction of various media files, and performs encoding and/or decoding of a media file by using a codec suitable for the corresponding format. The resource manager 1044 manages resources such as a source code, a memory, and a storage space of at least one of the applications 1070.

The power manager 1045 manages a battery and/or power, while operating together with a Basic Input/Output System (BIOS), and provides power information used for operation. The database manager 1046 manages generation, search, and/or change of a database to be used by at least one of the applications 1070. The package manager 1047 manages installation and/or an update of an application distributed in a form of a package file.

For example, the connectivity manager 1048 manages wireless connectivity such as Wi-Fi or Bluetooth. The notification manager 1049 displays and/or notifies an event, such as an arrival message, a promise, a proximity notification, and the like, in such a way as not to disturb a user. The location manager 1050 manages location information of an electronic device. The graphic manager 1051 manages a graphic effect that will be provided to a user, and/or a user interface related to the graphic effect. The security manager 1052 provides all security functions used for system security and/or user authentication. According to an embodiment of the present invention, when an electronic device 801, has a telephone call function, the middleware 1030 further includes a telephony manager for managing a voice and/or video communication function of the electronic device.

The middleware 1030 may include a middleware module that forms a combination of various functions of the aforementioned elements. The middleware 1030 provides modules specialized according to types of OSs in order to provide differentiated functions. Further, the middleware 1030 dynamically removes some of the existing elements and/or adds new elements.

The API 1060 (for example, the API 845) is a set of API programming functions, and may be provided with a different configuration according to the OS. For example, one API set may be provided for each of platforms, or two or more API sets may be provided for each platform.

The applications 1070 (for example, the application program 847) includes, for example, a home application 1071 a dialer application 1072, a Short Messaging Service (SMS)/Multimedia Messaging Service (MMS) application 1073, an Instant Messaging (IM) application 1074, a browser application 1075, a camera application 1076, an alarm application 1077, a contact application 1078, a voice dial application 1079, an email application 1080, a calendar application 1081, a media player application 1082, an album application 1083, a clock application 1084, and one or more applications capable of providing a function such as health care (for example, measurement of an exercise volume or blood sugar) or providing of environment information (for example, atmospheric pressure, humidity, or temperature information).

According to an embodiment of the present invention, the applications 1070 may include an application for supporting information exchange between the electronic device 801 and an external electronic device (for example, the electronic device 802 or 804), which is referred to as an "information exchange application". The information exchange application may include, for example, a notification relay application for relaying particular information to the external electronic device or a device management application for managing the external electronic device.

For example, the notification relay application relays notification information generated in the other applications (for example, the SMS/MMS application, the email application, the health care application, or the environment information application) of the electronic device to the external electronic device (for example, the electronic device 102 or 104). The notification relay application receives and provides the notification information from the external electronic device to the user. The device management application manages (for example, installs, deletes, or updates) at least one function (for example, power-on/power-off of the external electronic device (or some components) or display brightness (or resolution) control) of the external electronic device (for example, the electronic device 104) communicating with the electronic device, the application running on the external electronic device, or a service (for example, a call service or a messaging service) provided by the external electronic device.

According to an embodiment of the present invention, the applications 1070 include an application (for example, a health care application) designated based on an attribute (for example, a mobile medical device as a type of the electronic device) of the external electronic device (for example, the electronic device 802 or 804). According to an embodiment of the present invention, the applications 1070 include an application received from the external electronic device (for example, the server 806 or the electronic device 802 or 804). According to an embodiment of the present invention, the applications 1070 include a preloaded application or a third party application that may be downloaded from a server. The names of the elements of the program module 1010 may vary with a type of an OS.

According to an embodiment of the present invention, at least a part of the program module 1010 may be implemented by software, firmware, hardware, or a combination of at least two of them. Further, at least a part of the program module 1010 may be implemented by, for example, a processor (for example, the AP 910). At least a part of the program module 1010 may include, for example, a module, a program, a routine, sets of instructions, and a process for performing one or more functions.

According to an aspect of the present invention, a computer-readable recording medium is provided having recorded thereon a program for executing operations of: determining a line of sight of a user using an image sensor; determining an object located outside of an electronic device comprising the computer-readable recording medium, based on the line of sight of the user; determining object information regarding the object; receiving a user input with respect to the object from the user; and controlling the object or another electronic device associated with the object based on the user input and the object information.

The term "module", as used herein, may refer to, for example, a "unit" including one of hardware, software, and firmware, or a combination of two or more thereof. The term "module" can be interchangeable with other terms such as unit, logic, logical block, component, or circuit. A module may be a minimum unit of integrally configured components or a part thereof. A module may be a minimum unit for performing one or more functions or a part thereof. A module may be mechanically or electronically implemented. For example, a module, according to an embodiment of the present invention, includes at least one of an Application-Specific Integrated Circuit (ASIC) chip, a Field-Programmable Gate Arrays (FPGAs), and a programmable-logic device for performing operations, which have been known or will be developed in the future.

At least a part of a device (for example, modules or functions thereof) or a method (for example, operations), according to an embodiment of the present invention, may be implemented by instructions stored in the form of program modules in computer-readable storage media. When the instructions are executed by a processor (for example, the processor 120), the one or more processors may perform one or more functions corresponding to the instructions. The computer-readable storage medium may be, for example, the memory 130.

The computer readable recording media may include a magnetic media such as, for example, a hard disc, a floppy disc, and a magnetic tape, an optical recording media such as a Compact Disc Read Only Memory (CD-ROM) and a Digital Versatile Disc (DVD), a magneto-optical media such as a floptical disk, and a hardware device, such as a Read Only Memory (ROM), a Random Access Memory (RAM), and a flash memory, specifically configured to store and execute program instructions. In addition, the program instructions may include high class language codes, which may be executed in a computer by using an interpreter, as well as machine codes made by a compiler. The aforementioned hardware device may be configured to operate as one or more software modules in order to perform the above-described operations.

The module or program module, according to an embodiment of the present invention, may include at least one of the above-described elements, exclude some of them, or further include additional elements. The operations performed by the module, the program module, or other elements, according to various embodiments of the present invention, may be executed in a sequential, parallel, repeated, or heuristic manner. Also, some operations may be executed based on a different order, may be omitted, or may include an additional operation.

Other effects that may be obtained or expected from the embodiments of the present invention are explicitly or implicitly disclosed in the detailed description of the embodiments of the present invention.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for controlling a target object by a first electronic device, the method comprising:
   determining a line of sight of a user by synchronizing coordinates between an eye image of the user captured using a first camera of the first electronic device and a view image generated using a second camera of the first electronic device;
   determining a target object located outside of the electronic device based on the line of sight;
   determining whether the target object is capable of communicating with the first electronic device;
   if the target object is not a machine and is not capable of communicating with the first electronic device, generating a control signal for controlling a second electronic device capable of communicating with the first electronic device, wherein the second electronic device is capable of changing a state of the target object; and
   transmitting the control signal to the second electronic device such that the second electronic device changes the state of the target object based on the control signal.

2. The method of claim 1, further comprising:
   determining a direction of the line of sight of a user or a size of a pupil.

3. The method of claim 1, wherein determining the target object comprises:
   determining an image region of the target object based on a contour of at least a part of an image associated with the target object; and
   determining object information about the target object based on the image region.

4. The method of claim 3, wherein determining the image region comprises:
   determining the image region according to a gesture input or a voice input, which is inputted through the first electronic device.

5. The method of claim 3, wherein determining the object information about the target information comprises:
   determining, as the object information, at least one of a brand name associated with the target object, a form of the target object, an arrangement form of a button included in the target object, a color of the target object, an accessory attached to the target object, a trademark of the target object, and text information associated with the target object.

6. The method of claim 1, wherein generating the control signal for controlling the second electronic device comprises:
    determining device information about the second electronic device;
    comparing the device information with a device list pre-stored or a control history pre-stored; and
    generating the control signal for controlling the second electronic device based on the comparison result.

7. The method of claim 1, wherein generating the control signal for controlling the second electronic device comprises:
    receiving control information for controlling the second electronic device from an external server; and
    generating the control signal for controlling the second electronic device based on the control information.

8. The method of claim 1, wherein generating the control signal for controlling the second electronic device comprises:
    displaying one or more items for controlling the second electronic device on at least an area of a display device functionally connected to the first electronic device; and
    if an item from among the one or more items is selected, generating the control signal for controlling the second electronic device based on the selected item.

9. A first electronic device for controlling a target object, the electronic device comprising:
    a first camera and a second camera;
    a transceiver;
    a controller configured to:
    determine a line of sight of a user by synchronizing coordinates between an eye image of the user captured using the first camera and a view image generated using the second camera,
    determine a target object located outside of the first electronic device based on the line of sight,
    determine whether the target object is capable of communicating with the first electronic device, and
    if the target object is not a machine and is not capable of communicating with the first electronic device, generate a control signal for controlling a second electronic device capable of communicating with the first electronic device, wherein the second electronic device is capable of changing a state of the target object; and
    control the transceiver to transmit the control signal to the second electronic device such that the second electronic device changes the state of the target object based on the control signal.

10. The first electronic device of claim 9, wherein the controller is further configured to determine a direction of the line of sight of a user or a size of a pupil.

11. The first electronic device of claim 9, wherein the controller is further configured to:
    determine an image region of the target object based on a contour of at least a part of an image associated with the target object, and
    determine object information about the target object based on the image region.

12. The first electronic device of claim 11, wherein the controller is further configured to:
    determine the image region according to a gesture input or a voice input, which is inputted through the electronic device.

13. The first electronic device of claim 11, wherein the controller is further configured to:
    determine, as the object information, at least one of a brand name associated with the target object, a form of the target object, an arrangement form of a button included in the target object, a color of the target object, an accessory attached to the target object, a trademark of the target object, and text information associated with the target object.

14. The first electronic device of claim 11, wherein the controller is further configured to:
    determine device information about the second electronic device,
    compare the device information with a device list pre-stored or a control history pre-stored, and
    generate the control signal for controlling the second electronic device based on the comparison result.

15. The first electronic device of claim 9, wherein the controller is further configured to:
    control the transceiver to receive control information for controlling the second electronic device from an external server, and
    generate the control signal for controlling the second electronic device based on the control information.

16. The first electronic device of claim 9, wherein the controller is further configured to:
    control a display device functionally connected to the electronic device to display information for controlling one or more items for controlling the second electronic device, and
    if a item from among the one or more items is selected, generate the control signal for controlling the second electronic device based the selected item selected.

* * * * *